US009791586B2

(12) United States Patent
Bittar et al.

(10) Patent No.: US 9,791,586 B2
(45) Date of Patent: Oct. 17, 2017

(54) PROCESSING AND GEOSTEERING WITH A ROTATING TOOL

(75) Inventors: Michael S. Bittar, Houston, TX (US); Hsu-Hsiang Wu, Sugar Land, TX (US); Shanjun Li, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 783 days.

(21) Appl. No.: 13/502,571

(22) PCT Filed: Apr. 15, 2010

(86) PCT No.: PCT/US2010/031243
§ 371 (c)(1),
(2), (4) Date: Apr. 18, 2012

(87) PCT Pub. No.: WO2011/129828
PCT Pub. Date: Oct. 20, 2011

(65) Prior Publication Data
US 2012/0199394 A1  Aug. 9, 2012

(51) Int. Cl.
*G01V 3/28* (2006.01)
*E21B 47/026* (2006.01)

(52) U.S. Cl.
CPC .............. *G01V 3/28* (2013.01); *E21B 47/026* (2013.01)

(58) Field of Classification Search
CPC ... G01V 3/00; G01V 3/08; G01V 3/10; G01V 3/12; G01V 3/20; G01V 3/26; G01V 3/28; G01V 3/30; G01V 3/081; E21B 7/04; E21B 7/046; E21B 47/022; E21B 47/024; E21B 47/026; E21B 47/02216
USPC ............... 702/150, 6–7, 9, 11; 324/332–334, 324/337–339, 342–343, 345–347, 355, 324/366, 369; 175/40, 45, 50, 57, 61, 73
See application file for complete search history.

(56) References Cited

U.S. PATENT DOCUMENTS

| 6,163,155 A | 12/2000 | Bittar |
| 6,476,609 B1 | 11/2002 | Bittar |
| 6,541,979 B2 | 4/2003 | Omeragic |
| 6,788,065 B1 | 9/2004 | Homan et al. |
| 6,798,208 B2 | 9/2004 | Omeragic |
| 6,819,110 B2 | 11/2004 | Omeragic et al. |
| 6,911,824 B2 | 6/2005 | Bittar |
| 6,937,021 B2 | 8/2005 | Rosthal |
| 6,998,844 B2 | 2/2006 | Omeragic et al. |
| 7,019,528 B2 | 3/2006 | Bittar |

(Continued)

FOREIGN PATENT DOCUMENTS

| AU | 2010351029 B2 | 10/2013 |
| CN | 101460698 A | 6/2009 |

(Continued)

OTHER PUBLICATIONS

"Australian Patent Application No. 2010351029, First Examiners Report dated Oct. 18, 2012", 3 pgs.

(Continued)

*Primary Examiner* — Toan Le
(74) *Attorney, Agent, or Firm* — Gilliam IP PLLC

(57) ABSTRACT

Various embodiments include apparatus and methods of processing and geosteering with respect to well logging. Apparatus and methods may include acquiring signals generated from operating a tool rotating in a borehole of a well, where the tool includes a receiver antenna tilted with respect to the longitudinal axis of the tool and two transmitter antennas. The acquired signals can be processed with respect to a direction in the rotation of the tool to determine properties associated with a formation and/or to determine a geosignal for geosteering a drilling operation.

37 Claims, 14 Drawing Sheets

(56) References Cited

U.S. PATENT DOCUMENTS

| | | |
|---|---|---|
| 7,138,803 B2 | 11/2006 | Bittar |
| 7,202,670 B2 | 4/2007 | Omeragic et al. |
| 7,265,552 B2 | 9/2007 | Bittar |
| 7,385,400 B2 | 6/2008 | Moore |
| 7,557,579 B2 | 7/2009 | Bittar |
| 7,557,580 B2 | 7/2009 | Bittar |
| 2003/0030439 A1 | 2/2003 | Gao et al. |
| 2003/0051914 A1* | 3/2003 | Bittar .............................. 175/45 |
| 2003/0085707 A1* | 5/2003 | Minerbo et al. .............. 324/343 |
| 2004/0232986 A1 | 11/2004 | Hirose et al. |
| 2005/0024060 A1 | 2/2005 | Bittar |
| 2005/0140373 A1 | 6/2005 | Li et al. |
| 2005/0140374 A1 | 6/2005 | Itskovich |
| 2005/0189946 A1 | 9/2005 | Moore |
| 2005/0212520 A1 | 9/2005 | Homan et al. |
| 2006/0244455 A1* | 11/2006 | Bittar ........................... 324/337 |
| 2007/0235225 A1 | 10/2007 | Bittar |
| 2008/0078580 A1 | 4/2008 | Bittar |
| 2008/0143336 A1 | 6/2008 | Legendre et al. |
| 2008/0246486 A1 | 10/2008 | Forgang et al. |
| 2009/0015261 A1 | 1/2009 | Yang et al. |
| 2009/0224764 A1 | 9/2009 | Bittar |
| 2009/0302851 A1 | 12/2009 | Bittar et al. |
| 2009/0309600 A1 | 12/2009 | Seydoux et al. |
| 2010/0030477 A1 | 2/2010 | Yang et al. |
| 2012/0306500 A1 | 12/2012 | Bittar et al. |

FOREIGN PATENT DOCUMENTS

| | | |
|---|---|---|
| EP | 2108982 A2 | 10/2009 |
| GB | 2444800 A | 6/2008 |
| WO | WO-2008008386 A2 | 1/2008 |
| WO | WO-2008076130 | 2/2008 |
| WO | WO-2008076130 A1 | 6/2008 |
| WO | WO-2008115229 | 9/2008 |
| WO | WO-2008115229 A1 | 9/2008 |
| WO | WO-2009009342 A1 | 1/2009 |
| WO | WO-2009029517 A2 | 3/2009 |
| WO | WO-2009091408 A1 | 7/2009 |
| WO | WO-2011129828 A1 | 10/2011 |

OTHER PUBLICATIONS

"Australian Patent Application No. 2010351029, Response dated Sep. 26, 2013 to First Examiners Report dated Oct. 18, 2012", 20 pgs.

"International Application Serial No. PCT/US10/31243, International Preliminary Report on Patentability dated Oct. 26, 2012", 10 pgs.

"Canadian Application Serial No. 2,795,219, Office Action dated May 26, 2014", 3 pgs.

"International Application Serial No. PCT/US2010/031243, Invitation to Pay Fees dated Jan. 26, 2011", 6 pgs.

"International Application Serial No. PCT/US10/31243 Search Report dated Apr. 6, 2011", pgs.

"International Application Serial No. PCT/US10/31243 Written Opinion dated Apr. 6, 2011", 9 pgs.

"Canadian Application Serial No. 2,795,219, Response fled Nov. 25, 2014 to Office Action dated May 26, 2014", 53 pgs.

"Gulf Cooperation Council Application Serial No. 2011/18184, Office Action dated Jan. 19, 2015", (w/ English Summary), 2 pgs.

"Chinese Application Serial No. 201080066207.9, Office Action mailed Dec. 2, 2014", (w/ English Transaction), 16 pgs.

"United Kingdom Application Serial No. 1122110.8, Office Action dated Feb. 9, 2015", 4 pgs.

Bittar, M., et al., "A New Azimuthal Deep-Reading Resistivity Tool for Geosteering and Advanced Formation Evaluation.", *Paper SPE 109971 presented at the SPE Annual Technical Conference and Exhibition*, Anaheim, California, (Nov. 2007), 1-9.

"Canadian Application Serial No. 2,795,219, Office Action dated May 26, 2015", 3 pgs.

"Canadian Application Serial No. 2,795,219, Office Action dated May 26, 2015", 4 pgs.

"Chinese Application Serial No. 201080066207.9, Office Action dated Aug. 31, 2015", 12 pgs.

"Chinese Application Serial No. 201080066207.9, Response filed Apr. 17, 2015 to Office Action dated Dec. 2, 2014", (w/ English Translation of Amended Claims), 49 pgs.

"Gulf Cooperation Council Application Serial No. 2011/18184, Office Action dated Oct. 9, 2015", 5 pgs.

"United Kingdom Application Serial No. 1122110.8, Examination Report dated Jul. 24, 2015", 7 pgs.

"United Kingdom Application Serial No. 1122110.8, Response filed Jun. 8, 2015 to Office Action dated Feb. 9, 2015", 19 pgs.

"United Kingdom Application Serial No. 1122110.8, Amendment filed Dec. 8, 2015", 29 pgs.

"Canadian Application Serial No. 2,795,219, Office Action dated Jun. 23, 2016", 3 pgs.

"Malaysian Application Serial No. PI2011006172, Substantive Examination Clear Report dated Jun. 30, 2016", 3 pgs.

\* cited by examiner

110

Acquire Voltage Signals Generated from Operating a Tool Rotating in a Borehole of a Well, The Tool Including Multiple Transmitter Antennas and a Receiver Antenna Tilted with Respect to the Longitudinal Axis of the Tool

120

Process the Acquired Voltage Signals With Respect to a Direction in the Rotation of the Tool to Determine Properties Associated with a Formation in Vicinity of the Borehole, Including Determining a Coupling Matrix from the Acquired Voltage Signals

*FIG. 1*

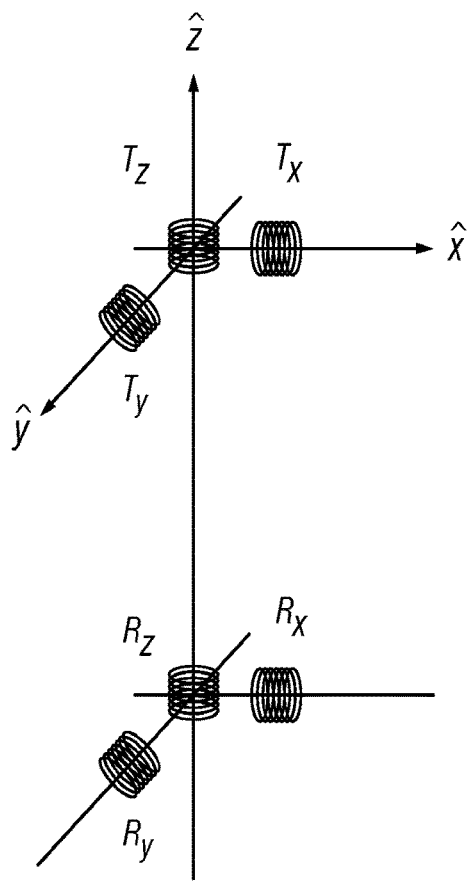

*FIG. 2*

PROCESSING AND GEOSTEERING WITH A ROTATING TOOL

RELATED APPLICATIONS

This application is a U.S. National Stage Filing under 35 U.S.C. 371 from International Application No. PCT/US2010/031243, filed on Apr. 15, 2010, and published as WO 2011/129828 A1 on Oct. 20, 2011; which application and publication are incorporated herein by reference in their entirety.

TECHNICAL FIELD

The present invention relates generally to systems having well logging capability.

BACKGROUND

In drilling wells for oil and gas exploration, understanding the structure and properties of the geological formation surrounding a borehole provides information to aid such exploration. However, the environment in which the drilling tools operate is at significant distances below the surface and measurements to manage operation of such equipment are made at these locations. Further, the usefulness of such measurements may be related to the precision or quality of the information derived from such measurements.

BRIEF DESCRIPTION OF THE DRAWINGS

FIG. 1 shows features of a method of determining properties associated with operating a tool in a borehole of a well, according to various embodiments.

FIG. 2 shows an antenna configuration for a multi-component electromagnetic logging tool, according to various embodiments.

DETAILED DESCRIPTION

Figure 3B:
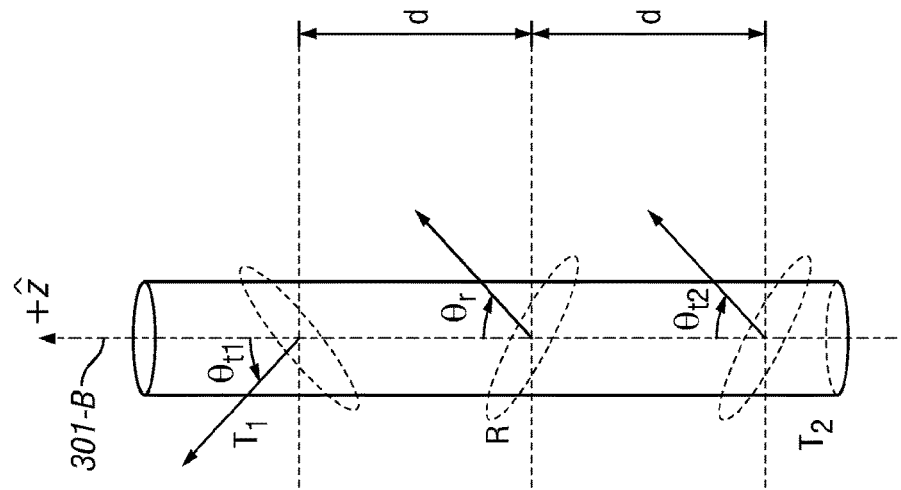
FIGS. 3A-B illustrate two kinds of antenna structures that can be used in a logging tool, according to various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

FIG. 1 shows features of an embodiment of a method of determining properties associated with operating a tool in a borehole of a well. At 110, voltage signals generated from operating a tool rotating in a borehole of a well are acquired, where the tool includes multiple transmitter antennas and a receiver antenna tilted with respect to the longitudinal axis of the tool. The acquired voltage signals can include voltage signals received at the tilted receiver antenna in response to firing separately the transmitter antennas associated with the tilted receiver antenna. The receiver and transmitter antennas of the tool can have various configurations. For example, two transmitter antennas can be placed essentially at the same location with different orientations. These transmitter antennas can be located on the tool above or below the tilted receiver antenna with respect to the longitudinal axis of the tool. In various embodiments, the tilted receiver antenna can be placed between the two transmitters with the two transmitters having different orientations. In various embodiments, in addition to the tilted receiver antenna, another tilted receiver antenna may be used. The two receiver antennas can placed between two transmitter antennas, where the two transmitter antennas have different orientations. Alternatively, two transmitter antennas can be used disposed between two titled receiver antennas. In each of these configurations, one or more of the transmitter antennas used can be tilted with respect to the longitudinal axis of the tool.

At 120, the acquired voltage signals are processed with respect to a direction in the rotation of the tool to determine properties associated with a formation in vicinity of the borehole, where the processing includes determining a coupling matrix from the acquired voltage signals. Such voltage signals can be generated from firing one of the transmitters and measuring a response at a tilted receiver with respect to the firing and firing another transmitter and measuring a response at a tilted receiver with respect to the firing of the other transmitter. The term firing is used to visualize transmitting a signal into a formation in the vicinity of the tool in the well. The transmitters are fired independent of one another such that a response a receiver can be correlated to the firing transmitter. This correlation can be realized by a processing unit keeping track of the measurement activities and their timing. The firing can include transmitting pulses from a transmitter such that each pulse is emitted from the transmitter while the other transmitters are in a period during which no pulses are emitted. In various embodiments, current measurements can be used to acquire signals to generate a coupling matrix.

Processing can include directly calculating coupling voltage components for a coupling matrix from the measured responses received in response to the set of transmitter firings. Direct calculation can include multiplication and addition related operations. However, such direct calculations can be conducted without more processing such as associated with solving a set of equations. Since the measured responses are related to electromagnetic propagation in the formation in the vicinity of the tool, one or more inversion operations can be performed to generate formation parameters from the determined coupling matrix. Inversion operations can include a comparison of measurements to predictions of a model such that a value or spatial variation of a physical property can be determined. A conventional inversion operation can include determining a variation of electrical conductivity in a formation, in the vicinity of the borehole that is being operated upon, from measurements of induced electric and magnetic fields.

The tool with its oriented antennas can be configured with an implementation in the borehole of a well as a measurements-while-drilling (MWD) system such as a logging-while-drilling (LWD) system or as a wireline system. A processing unit and/or a control unit can be configured downhole with the measuring antennas. Alternatively, one or more of a processing unit and a control unit can be configured at the surface of a well with a communication network to acquire information and/or to generate control signals with respect to the antennas of the tool. The communications can use wired or wireless communication mechanism associated with known downhole communication techniques.

In various embodiments, apparatus and processing schemes provide for electromagnetic logging with rotating tilted antenna systems with enhanced direct processing that use the measured signals when the tool is rotating in a borehole. Such processing schemes allow the solution of the coupling voltage matrix. Processing techniques can be based on a rotating LWD or wireline tool equipped with at least two tilted transmitter antennas and one tilted receiver antenna. This configuration along with processing schemes, discussed herein, allows the calculation of anisotropy, as exhibited by a horizontal resistivity $R_h$ and a vertical resistivity $R_v$, and the relative dip angle at any borehole deviation from the solution of the coupling voltage matrix determined form the measured signals. The relative dip angle is an angle between a planar feature such as a formation and a horizontal plane.

In various embodiments, apparatus and processing schemes, as discussed herein, can be used for geosteering operations. Geosteering is an intentional control to adjust drilling direction. The control can be based on downhole logging measurements to increase the borehole's exposure to a hydrocarbon-bearing formation (the "payzone"). Such geosteering can be used to maintain a wellbore within a region that provides a material that is a source of economic value. A geosignal is a signal or representation that can be used for geosteering. Geosignals are indicative of the direction of drilling tools downhole as well as capable of detecting boundaries. Capabilities of geosignals are useful in geosteering to optimize well placement for maximum oil recovery. Apparatus and processing schemes, as discussed herein, allow for the generation of a geosignal. A geosignal may be based one or more properties of earth formations as a function of distance from a reference point. The geosignals defined herein have a variety of applications. Geosignals also provide azimuthal orientation information of rotary tools. In addition, the geosignal can be used for the calculation of distance to bed boundaries. Processing techniques for the geosignal can be based on a rotating LWD or wireline tool equipped with at least two tilted transmitter antennas and one tilted receiver antenna. A configuration of one tilted transmitter antenna and one tilted receiver antenna can also be implemented to generate a geosignal.

FIG. 2 shows an embodiment of an antenna configuration for a multi-component electromagnetic logging tool. The magnetic field H in the receiver coils can be represented in terms of the magnetic moments M at the transmitters and a coupling matrix C as:

$$H=CM \qquad (1)$$

Equation (1) can be expressed as:

$$\begin{bmatrix} H_x \\ H_y \\ H_z \end{bmatrix} = \begin{bmatrix} C_{xx} & C_{xy} & C_{xz} \\ C_{yx} & C_{yy} & C_{yz} \\ C_{zx} & C_{zy} & C_{zz} \end{bmatrix} \begin{bmatrix} M_x \\ M_y \\ M_z \end{bmatrix} \qquad (2)$$

where $M_X$, $M_Y$, and $M_Z$ are the magnetic moments of the transmitted signal emitted by transmitters $T_X$, $T_Y$, and $T_Z$, respectively. $H_X$, $H_Y$, and $H_Z$ are the magnetic fields, which are proportional to the received signal at the receiver antennas $R_X$, $R_Y$, and $R_Z$, respectively. For the antenna configuration of FIG. 2, nine absolute or differential measurements can be obtained when each antenna is fired and a signal is measured at each of the three receivers, respectively. These nine measurements enable the determination of a complete coupling matrix C. The components, $C_{IJ}$, can be defined as $C_{IJ}=a_{IJ}\cdot V_I^J$, where I is the index of receiver $R_X$, $R_Y$, and $R_Z$, J is the index of receiver $T_X$, $T_Y$, and $T_Z$, $a_{IJ}$ is a constant coefficient determined by the tool design, and $V_I^J$ is a complex value representing the signal amplitude and phase shift measured by receiver I in response to the firing of transmitter J. In various embodiments, current measurements can be used to acquire signals to generate a coupling matrix.

Figure 3A:
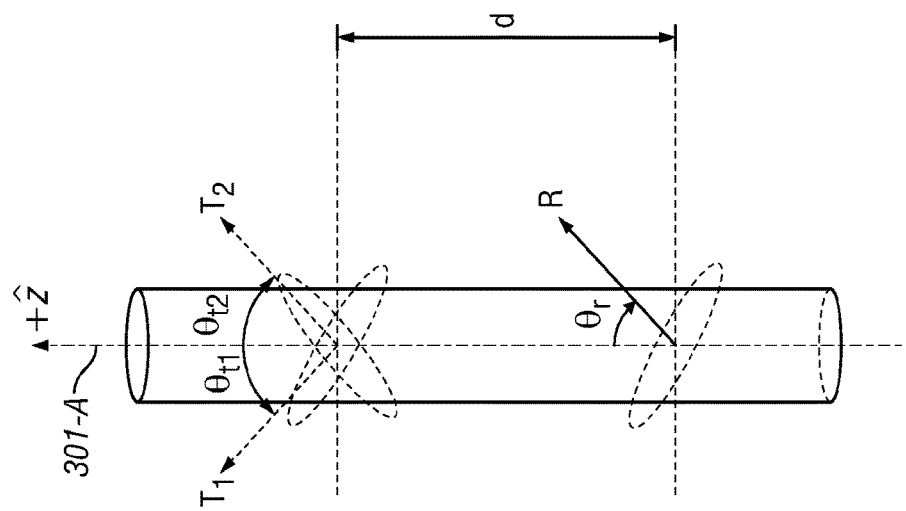

FIGS. 3A-B show a titled transmitter antenna and a tilted receiver antenna for a measuring tool. Such antennas can be equipped in a rotating LWD or wireline tool. While firing the transmitter antenna, the signal measured at the titled receiver of FIG. 3 can be expressed in terms of the signal voltage $V_R^T$, where T represents the firing transmitter antenna and R represents the receiving antenna. With both transmitter and receiver coils are oriented at the same azimuth angle β, the measured signal at the titled receiver is expressed as, $$V_R^T(\beta) = \begin{bmatrix} \sin\theta_t \cos\beta \\ \sin\theta_t \sin\beta \\ \cos\theta_t \end{bmatrix} \begin{bmatrix} V_x^x & V_y^x & V_z^x \\ V_x^y & V_y^y & V_z^y \\ V_x^z & V_y^z & V_z^z \end{bmatrix} \begin{bmatrix} \sin\theta_r \cos\beta \\ \sin\theta_r \sin\beta \\ \cos\theta_r \end{bmatrix}, \quad (3)$$

where $\theta_t$ is the tilt angle of the transmitter antenna relative to the z-axis (z-axis 301-A in FIG. 3A and z-axis 301-B in FIG. 3B) and $\theta_r$ is the tilt angle of the receiver related to the z-axis direction. Herein, $\theta_t$ and $\theta_r$ only range between −90 degree and 90 degree shown in FIGS. 3A-B. Based on equation (3), the measured signal can be also expressed as $V_R^T(\beta) = C_{xx} \cos^2\beta + C_{xy} \cos\beta \sin\beta + C_{xz} \cos\beta + C_{yx} \cos\beta \sin\beta + C_{yy} \sin^2\beta + C_{yz} \sin\beta + C_{zx} \cos\beta + C_{zy} \sin\beta + C_{zz}$ (4)

where $C_{xx} = V_x^x \sin\theta_t \sin\theta_r$; $C_{xy} = V_y^x \sin\theta_t \sin\theta_r$; $C_{xz} = V_z^x \sin\theta_t \cos\theta_r$ $C_{yx} = V_x^y \sin\theta_t \sin\theta_r$; $C_{yy} = V_y^y \sin\theta_t \sin\theta_r$; $C_{yz} = V_z^y \sin\theta_t \cos\theta_r$.

$C_{zx} = V_x^z \sin\theta_t \sin\theta_r$; $C_{zy} = V_y^z \sin\theta_t \sin\theta_r$; $C_{zz} = V_z^z \sin\theta_t \cos\theta_r$ Solving each component ($V_J^I$) of the coupling complex voltage matrix defined in equation (3) allows for the performance of one or more accurate inversion process that can generate formation properties for the well in which the tool is operating.

Figure 3C:
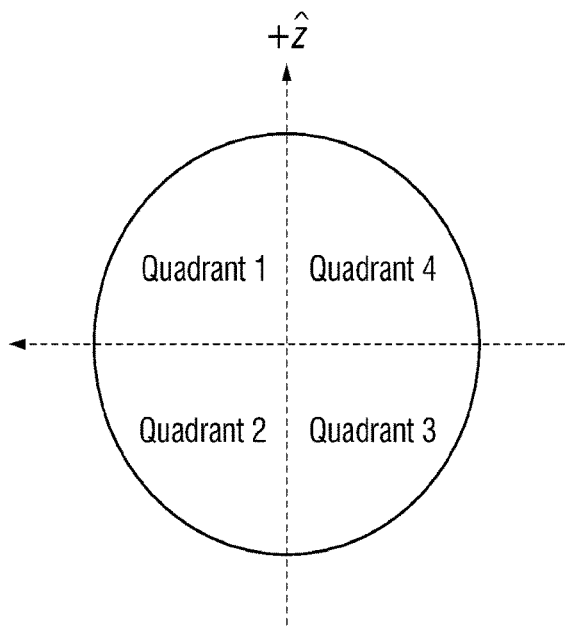
FIG. 3C shows quadrants for the tilt angles of antenna structures of FIGS. 3A-B, according to various embodiments.

FIGS. 3A-B illustrate two kinds of antenna structures that can be used to achieve direct solutions of coupling complex voltage matrix according to embodiments of processes discussed herein. The first type of structure, shown in FIG. 3A, includes two tilted transmitters placed at the same location with different orientations and a tilted receiver at a distance d from the transmitters. The tilt of these antennas is with respect to longitudinal axis 301-A. The second type of structure, shown in FIG. 3B, has a configuration with a tilted receiver placed at the center of two tilted transmitters with different orientations. To directly solve the coupling complex voltage matrix of either configuration in FIGS. 3A-B, two criteria are used. The first criterion is that the orientation of the receiver antenna cannot have a tilt angle of zero degrees and the orientation of the two transmitters cannot both be zero at the same time. The other criterion is that the orientations of the two transmitters are in adjacent quadrants. FIG. 3C shows an example of the quadrants with respect to tilt relative to the z-axis. In an embodiment, the tilt angles can be limited in either the first quadrant or the forth quadrant shown in FIG. 3C. Consequently, if the tilt angle of one transmitter, $\theta_{t1}$ of $T_1$, for example, of FIGS. 3A-B is in the first quadrant, the orientation of the other transmitter, $\theta_{t2}$ of $T_2$, for example, is in the forth quadrant. For simplicity, the orientation of one transmitter to the other transmitter is reversed in FIGS. 3A-B, that is, $\theta_{t1}$ equals—$\theta_{t2}$. With these parameters for orientation of tilted receiver and transmitters and using either one of the structures shown in FIGS. 3A-B, each component of the coupling complex voltage matrix can be directly derived from following equations (5a) to (5h).

$$V_z^z = \frac{1}{2N\cos\theta_{t1}\cos\theta_r} \left[ \sum_{i=1}^{N} V_R^{T1}\left(\frac{\beta_m}{2} + (i-1)\times\beta_i\right) + \sum_{i=1}^{N} V_R^{T2}\left(\frac{\beta_m}{2} + (i-1)\times\beta_i\right) \right] \quad (5a)$$

$$V_x^x = \frac{\left[\cos^2\left(\frac{\beta_m}{2}\right) - \sin^2\left(\frac{\beta_m}{2}\right)\right]^{-1}}{2\sin\theta_{t1}\sin\theta_r}$$

$$\left\{ \frac{1}{4}\left[V_R^{T1}\left(\frac{\beta_m}{2}\right) + V_R^{T1}\left(\frac{\beta_m}{2}+\pi\right) + V_R^{T1}\left(2\pi - \frac{\beta_m}{2}\right) + V_R^{T1}\left(\pi - \frac{\beta_m}{2}\right) - \right.\right.$$

$$V_R^{T2}\left(\frac{\beta_m}{2}\right) - V_R^{T2}\left(\frac{\beta_m}{2}+\pi\right) - V_R^{T2}\left(2\pi - \frac{\beta_m}{2}\right) - V_R^{T2}\left(\pi - \frac{\beta_m}{2}\right) \right] -$$

$$\frac{\sin^2\left(\frac{\beta_m}{2}\right)}{2}\left[V_R^{T1}\left(\frac{\beta_m}{2}\right) + V_R^{T1}\left(\frac{\beta_m}{2}+\pi\right) + V_R^{T1}\left(\frac{\beta_m}{2}+\frac{\pi}{2}\right) + V_R^{T1}\left(\frac{\beta_m}{2}+\frac{3\pi}{2}\right) - \right.$$

$$\left.\left. V_R^{T2}\left(\frac{\beta_m}{2}\right) - V_R^{T2}\left(\frac{\beta_m}{2}+\pi\right) - V_R^{T2}\left(\frac{\beta_m}{2}+\frac{\pi}{2}\right) - V_R^{T2}\left(\frac{\beta_m}{2}+\frac{3\pi}{2}\right)\right]\right\} \quad (5b)$$

$$V_y^y = -V_x^x + \frac{1}{2\sin\theta_{t1}\sin\theta_r} \times \left[ \frac{V_R^{T1}\left(\frac{\beta_m}{2}\right) + V_R^{T1}\left(\frac{\beta_m}{2}+\pi\right) + V_R^{T1}\left(\frac{\beta_m}{2}+\frac{\pi}{2}\right) + V_R^{T1}\left(\frac{\beta_m}{2}+\frac{3\pi}{2}\right)}{2} - \right.$$

$$\left. \frac{V_R^{T2}\left(\frac{\beta_m}{2}\right) + V_R^{T2}\left(\frac{\beta_m}{2}+\pi\right) + V_R^{T2}\left(\frac{\beta_m}{2}+\frac{\pi}{2}\right) + V_R^{T2}\left(\frac{\beta_m}{2}+\frac{3\pi}{2}\right)}{2} \right] \quad (5c)$$

-continued $$V_x^y = V_y^x \quad (5d)$$
$$= \frac{V_x^y + V_y^x}{2}$$
$$= \frac{\left[V_R^{T_1}\left(\frac{\beta_m}{2}\right) + V_R^{T_1}\left(\frac{\beta_m}{2} + \pi\right) - V_R^{T_2}\left(\frac{\beta_m}{2}\right) - V_R^{T_2}\left(\frac{\beta_m}{2} + \pi\right)\right]}{-2\sin\theta_{t1}\sin\theta_r} + 2V_x^x\cos^2\left(\frac{\beta_m}{2}\right) + 2V_y^y\sin^2\left(\frac{\beta_m}{2}\right)}{-4\cos\left(\frac{\beta_m}{2}\right)\sin\left(\frac{\beta_m}{2}\right)}$$

$$V_z^x = \frac{V_R^{T_1}\left(\frac{\beta_m}{2}\right) + V_R^{T_1}\left(2\pi - \frac{\beta_m}{2}\right) + V_R^{T_2}\left(\frac{\beta_m}{2} + \pi\right) + V_R^{T_2}\left(\pi - \frac{\beta_m}{2}\right)}{4\sin\theta_{t1}\cos\theta_r\cos\left(\frac{\beta_m}{2}\right)} - \frac{V_z^z\cot\theta_{t1}}{\cos\left(\frac{\beta_m}{2}\right)} \quad (5e)$$

$$V_z^y = \frac{V_R^{T_1}\left(\frac{\beta_m}{2} + \frac{\pi}{2}\right) + V_R^{T_1}\left(\frac{\pi}{2} - \frac{\beta_m}{2}\right) + V_R^{T_2}\left(\frac{\beta_m}{2} + \frac{3\pi}{2}\right) + V_R^{T_2}\left(\frac{3\pi}{2} - \frac{\beta_m}{2}\right)}{4\sin\theta_{t1}\cos\theta_r\cos\left(\frac{\beta_m}{2}\right)} - \frac{V_z^z\cot\theta_{t1}}{\cos\left(\frac{\beta_m}{2}\right)} \quad (5f)$$

$$V_x^z = \frac{V_R^{T_1}\left(\frac{\beta_m}{2}\right) + V_R^{T_1}\left(2\pi - \frac{\beta_m}{2}\right) + V_R^{T_2}\left(\frac{\beta_m}{2}\right) + V_R^{T_2}\left(2\pi - \frac{\beta_m}{2}\right)}{4\cos\theta_{t1}\sin\theta_r\cos\left(\frac{\beta_m}{2}\right)} - \frac{V_z^z\cot\theta_r}{\cos\left(\frac{\beta_m}{2}\right)} \quad (5g)$$

$$V_y^z = \frac{V_R^{T_1}\left(\frac{\beta_m}{2} + \frac{\pi}{2}\right) + V_R^{T_1}\left(\frac{\pi}{2} - \frac{\beta_m}{2}\right) + V_R^{T_2}\left(\frac{\beta_m}{2} + \frac{\pi}{2}\right) + V_R^{T_2}\left(\frac{\pi}{2} - \frac{\beta_m}{2}\right)}{4\cos\theta_{t1}\sin\theta_r\cos\left(\frac{\beta_m}{2}\right)} - \frac{V_z^z\cot\theta_r}{\cos\left(\frac{\beta_m}{2}\right)} \quad (5h)$$

where $V_R^{T_1}$ and $V_R^{T_2}$ are measured voltages at the receiver (R) when emitting transmitter $T_1$ and transmitter $T_2$, respectively, are independently firing.

Figure 4:
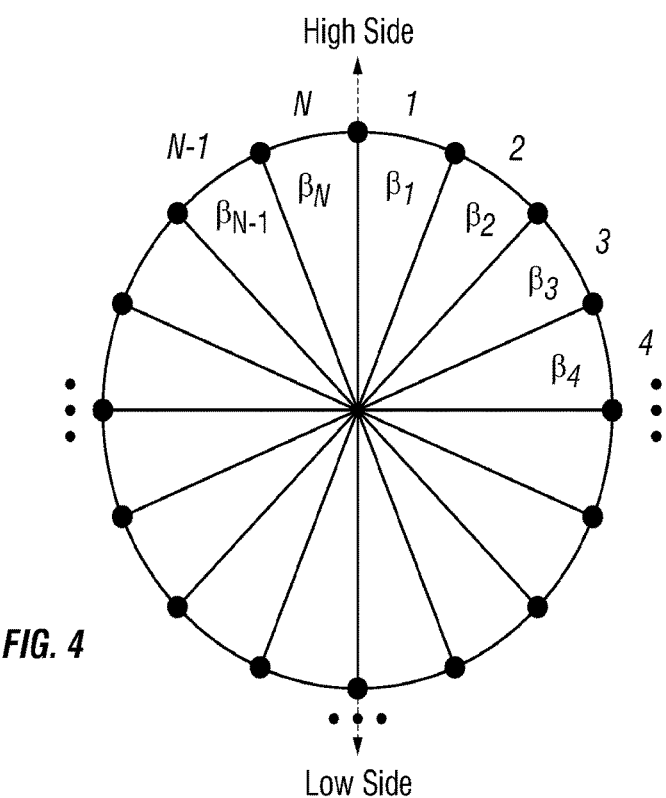
FIG. 4 shows a configuration of tool bin positions and corresponding azimuthal angles, according to various embodiments.

While the tool is rotating, the value of $V_R^{T_1}$ and $V_R^{T_2}$ varies with respect to azimuth angle $\beta$ defined in equation (3). The rotation of the tool can be partitioned into N segments, called bins, in which completion of the N bins is one complete rotation of the tool, $N \geq 2$, where N is the total number of bins. Each bin has an associated azimuthal angle $\beta$. With the tool rotation partitioned into equal amounts of angular rotation, each bin has an equal angle of rotation, $\beta_m$. As shown in FIG. 4, $\beta_m$ is an evenly-divided azimuthal angle given by $\beta_m = 2\pi/N$, where m demotes that the azimuthal angle considered is for the mth bin. Thus, equations 5(a)-5(h) provide the components of the coupling complex voltage matrix from measured responses in a selected bin, which corresponds to a particular direction as shown in FIG. 4. In various applications, N can be equal to 32. However, N can be set to other values.

In various embodiments, sets of transmitting and receiving antennas can be arranged in a tilted transmitter-receiver (Tx-Rx) antenna system to provide responses from probing formations in a well hole to be used to provide a coupling complex voltage matrix that can be used to determine properties associated with the formations. FIG. 3D illustrates an embodiment of multiple sets of antennas tilted with respect to axis 301-D. One set includes two tilted transmitters, $T_1$ and $T_2$, placed at the same location with different orientations and a tilted receiver, $R_1$, at a distance $d_1$ from the transmitters $T_1$ and $T_2$. Another set includes two tilted transmitters, $T_3$ and $T_4$, placed at the same location with different orientations and a tilted receiver, $R_2$, at a distance $d_1$ from the transmitters $T_3$ and $T_4$. In this configuration, two matrices of coupling complex voltages can be obtained with one matrix related to the configuration relative to distance $d_1$ and the other matrix utilized with regards to structures with a distance $d_2$ taking into account upper transmitters, $T_1$ and $T_2$, with lower receiver $R_2$ and lower transmitters $T_3$ and $T_4$ with upper receiver $R_1$.

Figure 3E:
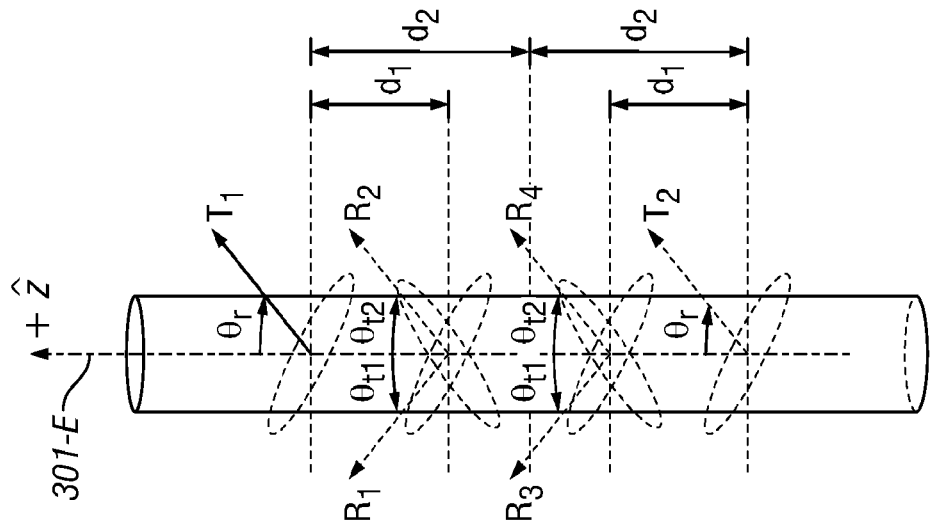
FIGS. 3D-E illustrate multiple sets of antennas tilted with respect to the axis of the tool in which they are configured, according to various embodiments.
Figure 3D:
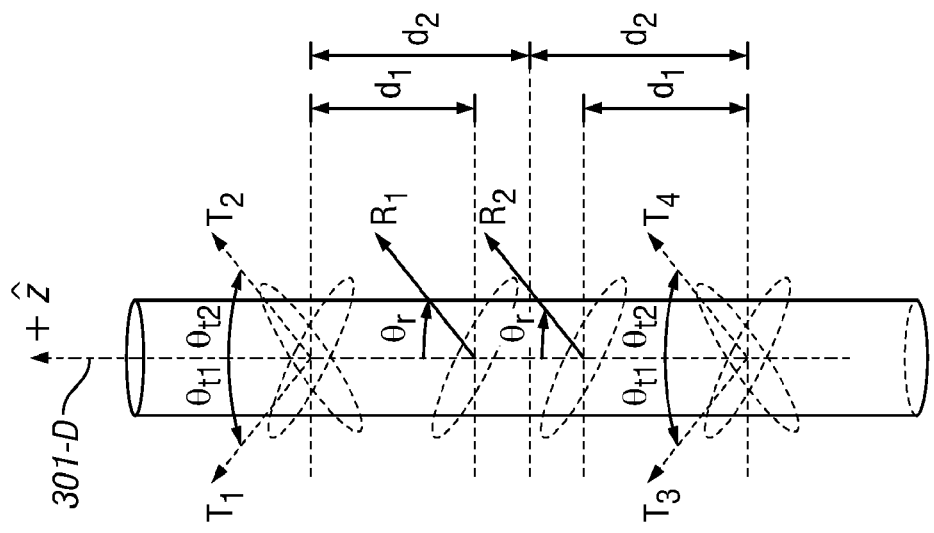

FIG. 3E illustrates an embodiment of multiple sets of antennas tilted with respect to axis 301-E. One set includes one tilted transmitter, $T_1$, placed above two tilted receivers, $R_1$ and $R_2$, at the same location with different orientations at a distance $d_1$ from the transmitter $T_1$. Another set includes one tilted transmitter, $T_2$, placed below two tilted receivers, $R_3$ and $R_4$, at the same location with different orientations at a distance $d_1$ from the transmitter $T_2$. In this configuration, two matrices of coupling complex voltages can be obtained with one matrix related to the configuration relative to distance $d_1$ and the other matrix utilized with regards to structures with a distance $d_2$ taking into account upper transmitter, $T_1$, with lower receivers $R_3$ and $R_4$ and lower transmitter $T_2$ with upper receivers $R_1$ and $R_2$. Other configurations of transmitter and receiver antennas can be used to provide response signals for processing to determine properties associated with formations around a well hole in accordance with various embodiments discussed herein.

With the orientations of the antennas fixed by the criteria discussed above and with $\theta_{t1}$ equals—$\theta_{t2}$, equations 5(a)-5

Figure 5:
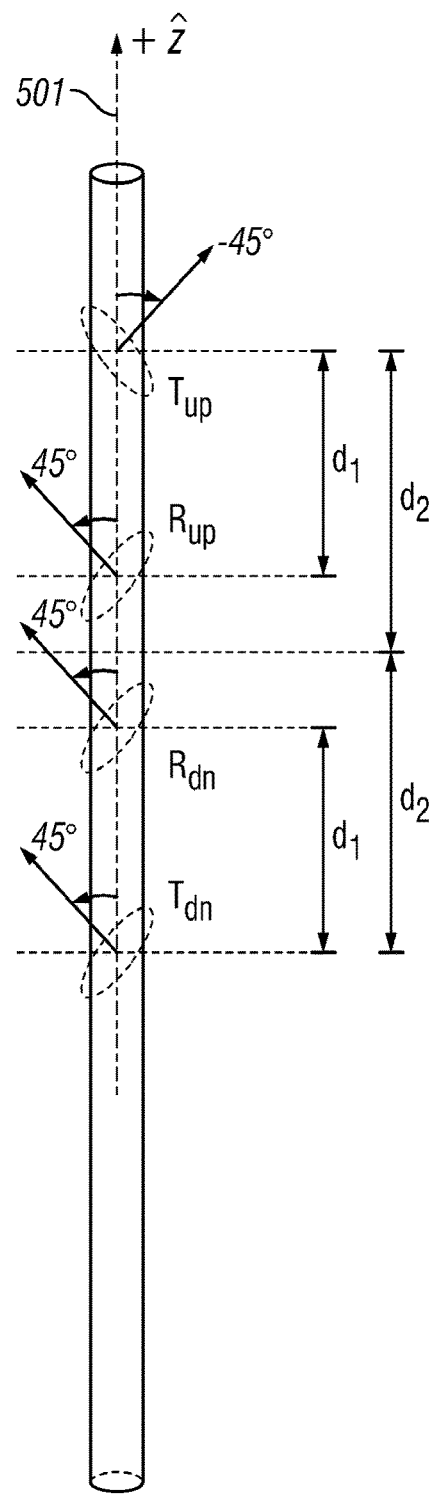
FIG. 5 shows a tool with two transmitters tilted at +45 and −45 degrees and central receivers tilted at an angle of 45 degrees with respect to a longitudinal axis, according to various embodiments.

(h) can be further simplified by choosing a particular tilt angle. FIG. 5 shows an embodiment of a tool with two transmitters tilted at +45 and −45 degrees and central receivers tilted at an angle of 45 degrees with respect to longitudinal axis 501. This configuration provides a perpendicularly tilted transmitter-receiver (Tx-Rx) antenna system. In this configuration, two matrices of coupling complex voltages can be obtained. As shown in FIG. 5, one voltage matrix is related to the configuration of antenna structures with a distance $d_1$ between a signal transmitter antenna and a signal receiver antenna, in which acquired responses include the signals of $V_{R_{up}}^{T_{up}}$ and $V_{R_{dn}}^{T_{dn}}$ with respect to $T_{up}$, $R_{up}$, $T_{dn}$, and $R_{dn}$ shown in FIG. 5. The other voltage matrix is utilized with regards to structures with a distance $d_2$ between a signal transmitter and a signal receiver, which involves the signals of $V_{R_{dn}}^{T_{up}}$ and $V_{R_{up}}^{T_{dn}}$ with respect to $T_{up}$, $R_{up}$, $T_{dn}$, and $R_{dn}$ shown in FIG. 5. Then, each component of either coupling complex voltage matrix can be directly processed as follows.

where $V_R^U$ is a measured voltage at receivers ($R_{up}$ or $R_{dn}$) when the upper transmitter ($T_{up}$) is used and $V_R^L$ is measured voltage at receivers ($R_{up}$ or $R_{dn}$) when the lower transmitter ($T_{dn}$) is used. The nomenclature $V_R^U$ ( ) means the measured voltage $V_R^U$ at the bin corresponding to the azimuthal angle listed within ( ). For instance, $V_R^U$ ($\beta_m/2$) means the measured voltage $V_R^U$ at the selected bin, which is bin 1 shown in FIG. 4 if the azimuthal angle of high side is defined as zero, and $V_R^U(\beta_m/2+\pi/2)$ means the measured voltage $V_R^U$ at the bin that is a positive 90 degrees in the rotation from the selected bin. In addition, $V_R^U(\beta_m/2+(i-1)\beta_i)$ means the measured voltage $V_R^U$ at the bin that is $(i-1)$ bins in the rotation from the selected bin.

According to the principle of reciprocity, one should expect that one antenna may be applied as a transmitter in one implementation and as a receiver at another. The configurations of transmitters-receivers antenna system disclosed herein can be interchangeable, i.e., transmitters can be used as receivers and receivers can be used as transmitters.

$$V_z^z = \frac{1}{N}\sum_{i=1}^{N} V_R^U\left(\frac{\beta_m}{2} + (i-1)\times\beta_i\right) + \frac{1}{N}\sum_{i=1}^{N} V_R^L\left(\frac{\beta_m}{2} + (i-1)\times\beta_i\right) \quad (6a)$$

$$V_x^x = \left\{\frac{1}{4}\times\left[V_R^U\left(\frac{\beta_m}{2}\right) + V_R^U\left(\frac{\beta_m}{2}+\pi\right) + V_R^U\left(2\pi-\frac{\beta_m}{2}\right) + V_R^U\left(\pi-\frac{\beta_m}{2}\right) - V_R^L\left(\frac{\beta_m}{2}\right) - V_R^L\left(\frac{\beta_m}{2}+\pi\right) - V_R^L\left(2\pi-\frac{\beta_m}{2}\right) - V_R^L\left(\pi-\frac{\beta_m}{2}\right)\right] - \frac{\sin^2\left(\frac{\beta_m}{2}\right)}{2}\times\left[V_R^U\left(\frac{\beta_m}{2}\right) + V_R^U\left(\frac{\beta_m}{2}+\pi\right) + V_R^U\left(\frac{\beta_m}{2}+\frac{\pi}{2}\right) + V_R^U\left(\frac{\beta_m}{2}+\frac{3\pi}{2}\right) - V_R^L\left(\frac{\beta_m}{2}\right) - V_R^L\left(\frac{\beta_m}{2}+\pi\right) - V_R^L\left(\frac{\beta_m}{2}+\frac{\pi}{2}\right) - V_R^L\left(\frac{\beta_m}{2}+\frac{3\pi}{2}\right)\right]\right\}\times\left[\sin^2\left(\frac{\beta_m}{2}\right) - \cos^2\left(\frac{\beta_m}{2}\right)\right]^{-1} \quad (6b)$$

$$V_y^y = -V_x^x - \frac{V_R^U\left(\frac{\beta_m}{2}\right) + V_R^U\left(\frac{\beta_m}{2}+\pi\right) + V_R^U\left(\frac{\beta_m}{2}+\frac{\pi}{2}\right) + V_R^U\left(\frac{\beta_m}{2}+\frac{3\pi}{2}\right)}{2} + \frac{V_R^L\left(\frac{\beta_m}{2}\right) + V_R^L\left(\frac{\beta_m}{2}+\pi\right) + V_R^L\left(\frac{\beta_m}{2}+\frac{\pi}{2}\right) + V_R^L\left(\frac{\beta_m}{2}+\frac{3\pi}{2}\right)}{2} \quad (6c)$$

$$V_x^y = V_y^x = \frac{V_x^y + V_y^x}{2} = \frac{\left[V_R^U\left(\frac{\beta_m}{2}\right) + V_R^U\left(\frac{\beta_m}{2}+\pi\right) - V_R^L\left(\frac{\beta_m}{2}\right) - V_R^L\left(\frac{\beta_m}{2}+\pi\right)\right] + 2V_x^x\cos^2\left(\frac{\beta_m}{2}\right) + 2V_y^y\sin^2\left(\frac{\beta_m}{2}\right)}{-4\cos\left(\frac{\beta_m}{2}\right)\sin\left(\frac{\beta_m}{2}\right)} \quad (6d)$$

$$V_z^x = \frac{V_R^U\left(\frac{\beta_m}{2}\right) + V_R^U\left(2\pi-\frac{\beta_m}{2}\right) + V_R^L\left(\frac{\beta_m}{2}+\pi\right) + V_R^L\left(\pi-\frac{\beta_m}{2}\right)}{-2\cos\left(\frac{\beta_m}{2}\right)} + \frac{V_z^z}{\cos\left(\frac{\beta_m}{2}\right)} \quad (6e)$$

$$V_z^y = \frac{V_R^U\left(\frac{\beta_m}{2}+\frac{\pi}{2}\right) + V_R^U\left(\frac{\pi}{2}-\frac{\beta_m}{2}\right) + V_R^L\left(\frac{\beta_m}{2}+\frac{3\pi}{2}\right) + V_R^L\left(\frac{3\pi}{2}-\frac{\beta_m}{2}\right)}{-2\cos\left(\frac{\beta_m}{2}\right)} + \frac{V_z^z}{\cos\left(\frac{\beta_m}{2}\right)} \quad (6f)$$

$$V_x^z = \frac{V_R^U\left(\frac{\beta_m}{2}\right) + V_R^U\left(2\pi-\frac{\beta_m}{2}\right) + V_R^L\left(\frac{\beta_m}{2}\right) + V_R^L\left(2\pi-\frac{\beta_m}{2}\right)}{2\cos\left(\frac{\beta_m}{2}\right)} - \frac{V_z^z}{\cos\left(\frac{\beta_m}{2}\right)} \quad (6g)$$

$$V_y^z = \frac{V_R^U\left(\frac{\beta_m}{2}+\frac{\pi}{2}\right) + V_R^U\left(\frac{\pi}{2}-\frac{\beta_m}{2}\right) + V_R^L\left(\frac{\beta_m}{2}+\frac{\pi}{2}\right) + V_R^L\left(\frac{\pi}{2}-\frac{\beta_m}{2}\right)}{2\cos\left(\frac{\beta_m}{2}\right)} - \frac{V_z^z}{\cos\left(\frac{\beta_m}{2}\right)} \quad (6h)$$

Figure 6:
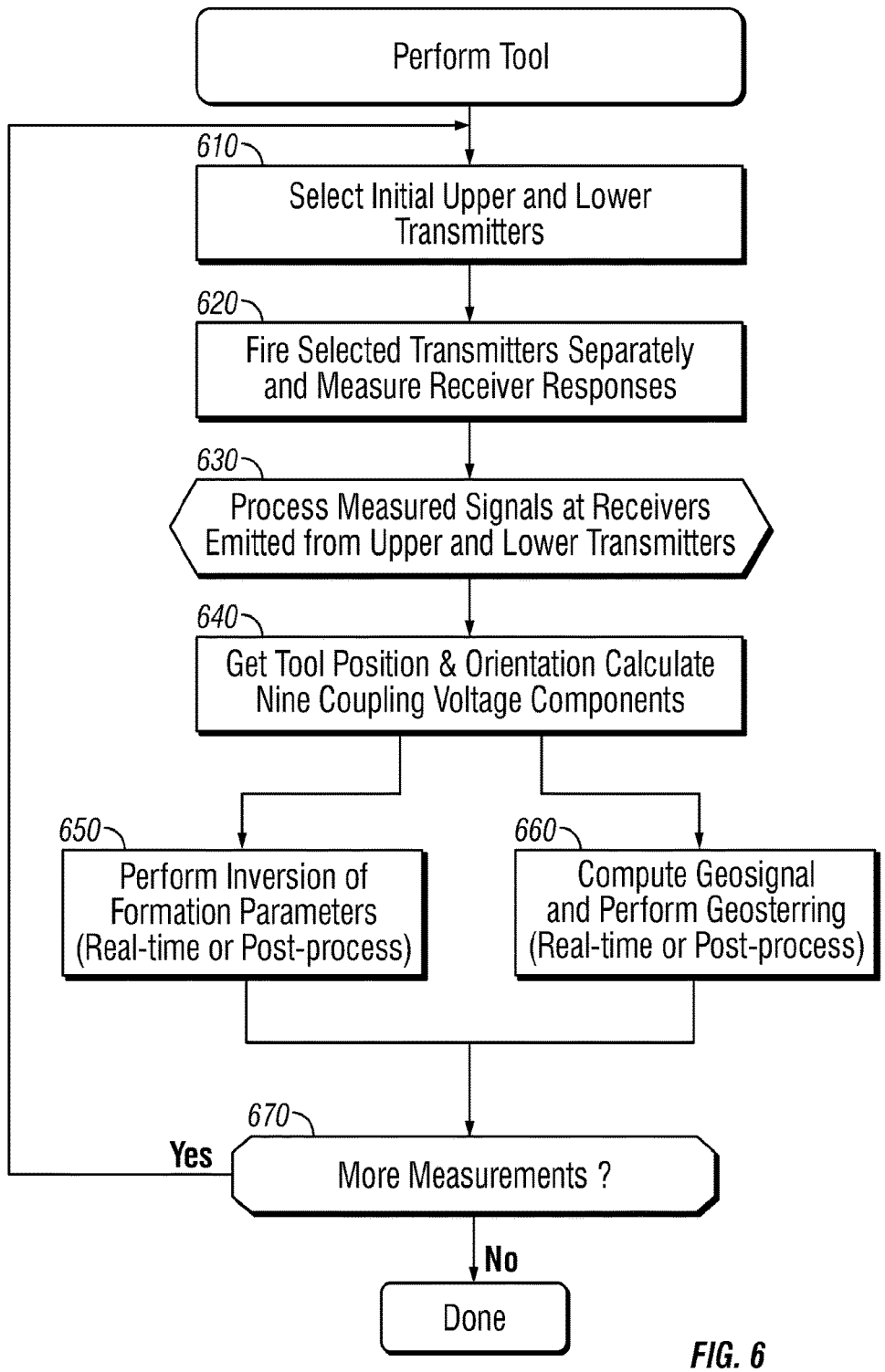
FIG. 6 shows an example flow chart of performing a rotating logging tool, according to various embodiments.

Once the coupling voltages matrix is obtained using the above described processing, formation parameters can be obtained using standard inversion techniques, such as a least squares method. A flow chart of an embodiment of a method implementing the configuration of tilted antennas as shown in FIG. 5 is presented in FIG. 6. At 610, initial upper and lower transmitters are selected for firing. At 620, the selected transmitters are fired separately and receiver responses are measured. At 630, the measured signals at the receivers responsive to the firing of the upper and lower transmitters are processed. At 640, the tool position and orientation are collected. The tool position is correlated to a specific bin for the measured signals. The tool may include a sensor or other mechanism to determine tool position and tool orientation including with respect to azimuthal angle. For a bin, nine coupling voltage components are calculated in accordance with equations 5(a)-5(h). At 650, from the nine coupling voltage components, inversion operations can be performed to determine formation properties. These formation properties may be determined essentially in real-time or as a post-process operation. At 660, from the nine coupling voltage components, a geosignal may be determined. The geosignal may used in a geosteering operation in the well. The geosignal determination and subsequent geo steering may be performed essentially in real-time or as a post-process operation. At 670, a determination is made as to whether additional measurements are to be taken. These additional measurements may be conducted for one or more other bins.

Figure 7A:
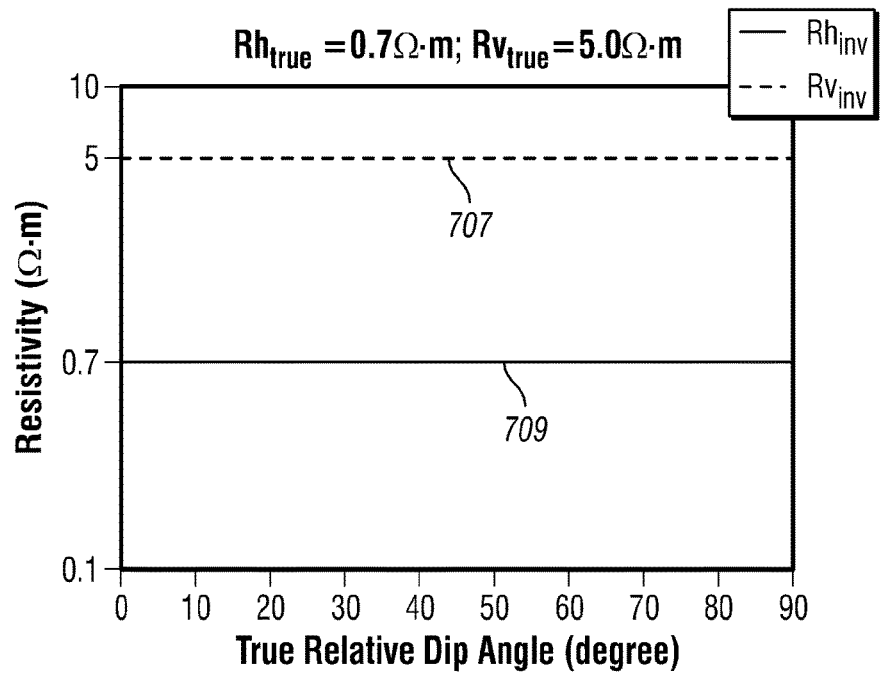
FIG. 7A-B shows inversion results using the responses of the antenna configuration for a tool shown in FIG. 5 for a particular formation model, in accordance with various embodiments.
Figure 7B:
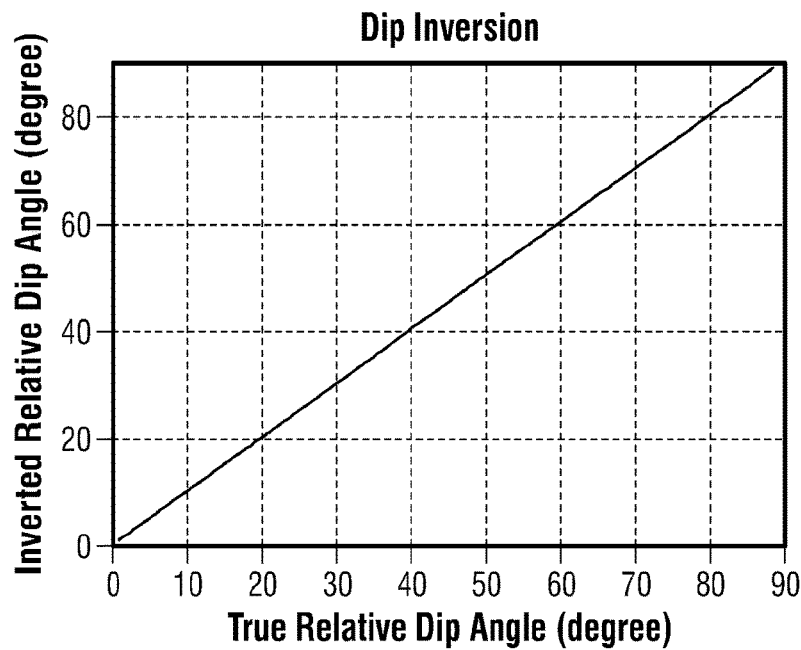

Several modeling cases were evaluated with respect to the processes described above under a wide range of dip angle, $R_h$ values, and $R_v$ values. FIGS. 7A-B shows inversion results using the responses of the antenna configuration for a tool shown in FIG. 5 for a particular formation model. The formation model includes a horizontal resistivity $R_h$ of 0.7 Ω·m and a vertical resistivity $R_v$ of 5.0 Ω·m at arbitrary relative dip angle from 0 degrees to 90. Curve 707 in FIG. 7A shows the inversion results for $R_v$ from the tool and curve 709 shows the inversion results for $R_h$ from the tool. FIG. 7B shows the dip angle from the inversion results that matches the dip angle from the model.

Figure 8A:
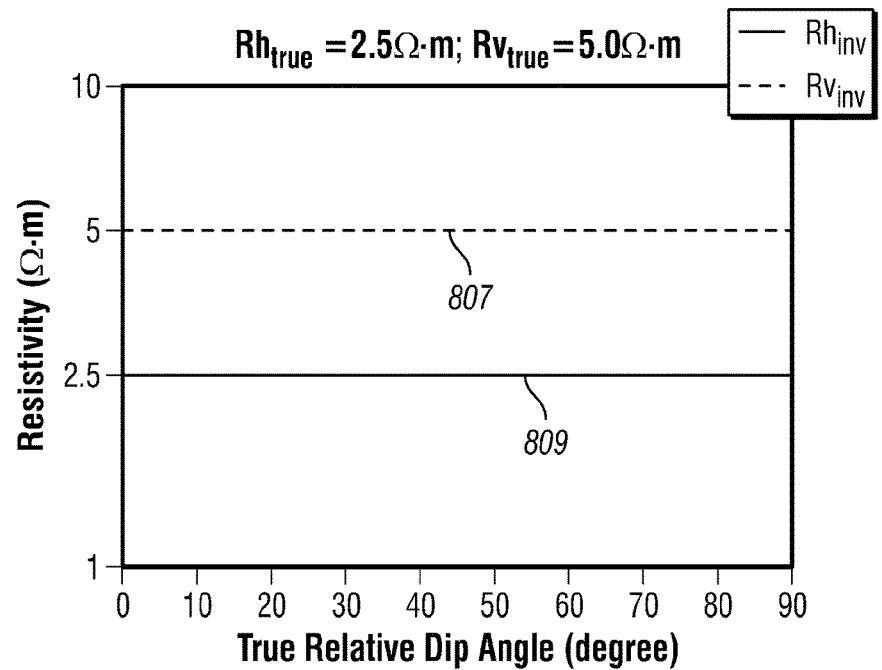
FIG. 8A-B shows inversion results using the responses of the antenna configuration for a tool shown in FIG. 5 for another formation model, in accordance with various embodiments.
Figure 8B:
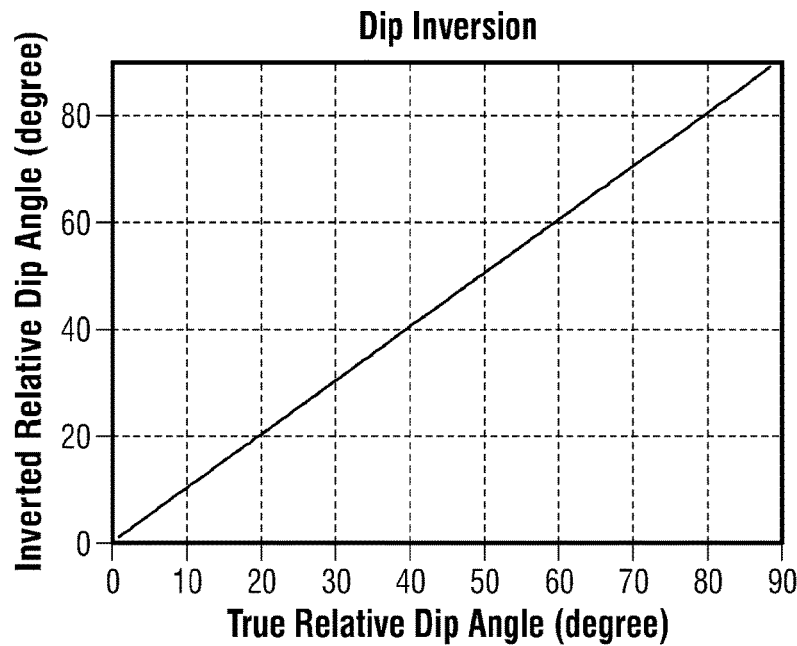

FIG. 8 shows inversion results using the responses of the antenna configuration for a tool shown in FIG. 5 for another formation model. This formation model includes a horizontal resistivity $R_h$ of 2.5 Ω·m and a vertical resistivity $R_v$ of 5.0 Ω·m at arbitrary relative dip angle from 0 degrees to 90 degrees. Curve 807 in FIG. 8A shows the inversion results for $R_v$ from the tool and curve 809 shows the inversion results for $R_h$ from the tool. FIG. 8B shows the dip angle from the inversion results that matches the dip angle from the model. These inversion results for bin 1 shown in FIGS. 7A-B and 8A-B produce good solutions and compare well with modeled data, which demonstrates the robustness of the techniques of the various embodiments at all hole deviations.

In various embodiments, geosignal responses can be determined using tools equipped with tilted transmitter and tilted receiver structures as discussed herein. The determined geosignal responses can be used for geosteering applications. Such geosteering applications can be conducted with, but are not limited to, rotating LWD tools equipped with tilted transmitter and tilted receiver structures. Geosignal responses can be calculated by processing the measured signal at the receivers. For a rotating tilted transmitter and tilted receiver tool with azimuthal angle β, a complex voltage $V_{CZ}(β)$ referenced to the cross-coupling measurements (for example, ZX and XZ measurements with the z-axis oriented as in FIGS. 1-5 and x-axis orthogonal to the z-axis as in FIG. 1) is defined as:

$$V_{CZ}(\beta) = \frac{1}{4\sqrt{2}}\left[V_R^T\left(\beta - \frac{\pi}{4}\right) - V_R^T\left(\beta + \frac{3\pi}{4}\right) + V_R^T\left(\beta + \frac{\pi}{4}\right) - V_R^T\left(\beta + \frac{5\pi}{4}\right)\right] \quad (7)$$

Figure 9:
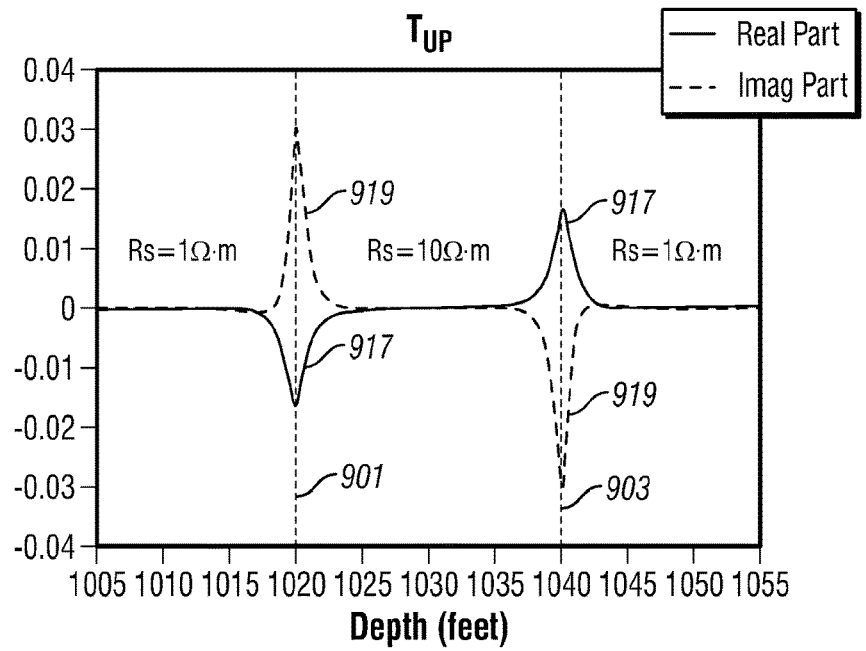
FIG. 9 illustrates an example response of a complex voltage referenced to the cross-coupling measurements for the upper transmitter-receiver pair of FIG. 5 when drilling in a three-layer isotropic formation, in accordance with various embodiments.
Figure 10:
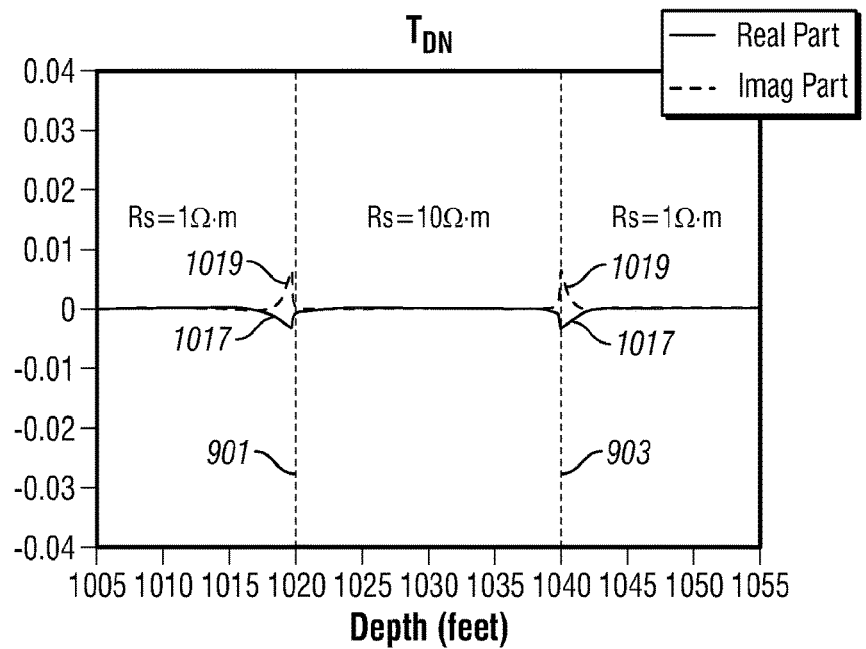
FIG. 10 illustrates an example response of a complex voltage referenced to the cross-coupling measurements for the lower transmitter-receiver pair of FIG. 5 when drilling in the three-layer isotropic formation of FIG. 9, in accordance with various embodiments.

FIG. 9 illustrates an example response of $V_{CZ}(β)$ for the upper transmitter-receiver pair ($T_{up}$ and $R_{up}$) of FIG. 5 when drilling in a three-layer isotropic formation. Transmitter $T_{up}$ is fired and the voltage at $R_{up}$ is measured for the azimuthal direction defined by bin 1 of FIG. 4. $V_{CZ}(β)$ has a real part 917 and an imaginary part 919, where both parts show significant changes at boundaries 901 and 903. FIG. 10 illustrates an example response of $V_{CZ}(β)$ for the lower transmitter-receiver pair ($T_{dn}$ and $R_{dn}$) of FIG. 5 when drilling in the three-layer isotropic formation. Transmitter $T_{dn}$ is fired and the voltage at $R_{dn}$ is measured for the azimuthal direction defined by bin 1 of FIG. 4. $V_{CZ}(β)$ has a real part 1017 and an imaginary part 1019, where both parts show changes at boundaries 901 and 903. The drilling for the examples of FIGS. 9 and 10 is at a relative dip angle of 85 degrees. The first layer has a resistivity of 1 ohm-m, the middle layer has a resistivity of 10 ohm-m, and the last layer has a resistivity of 1 ohm-m.

Figure 11:
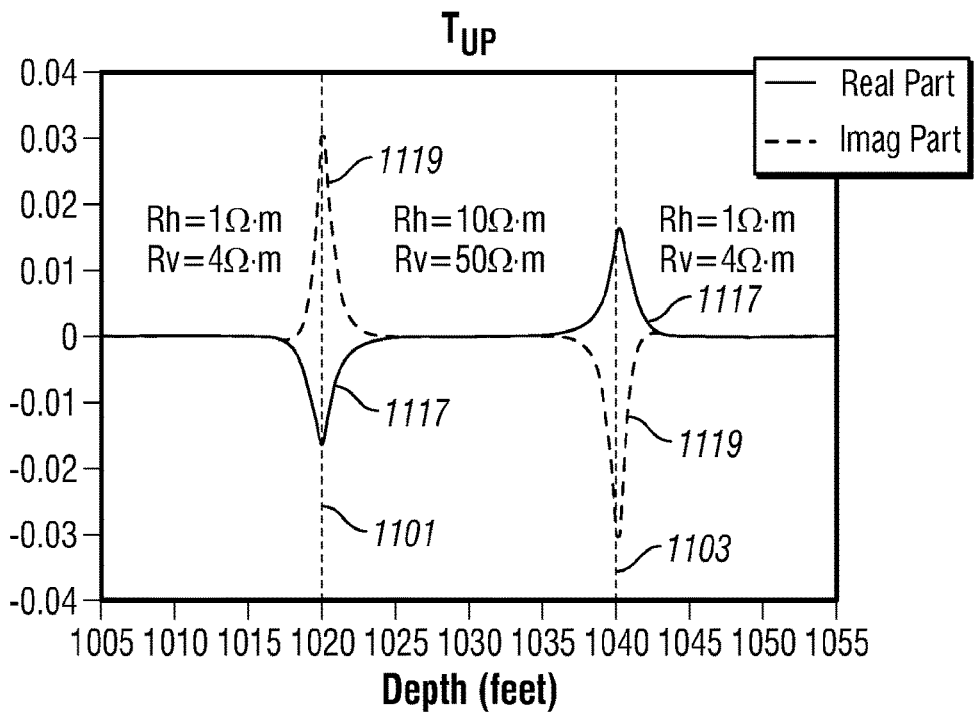
FIG. 11 illustrates an example response of a complex voltage referenced to the cross-coupling measurements for the upper transmitter-receiver pair of FIG. 5 when drilling in a three-layer anisotropic formation, in accordance with various embodiments.
Figure 12:
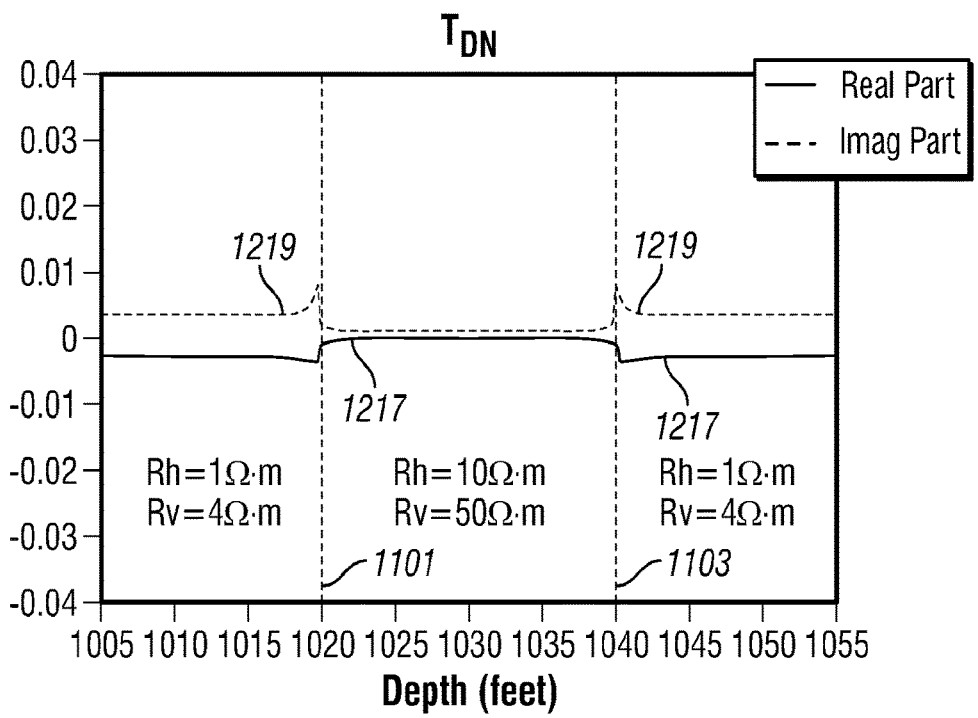
FIG. 12 illustrates an example response of a complex voltage referenced to the cross-coupling measurements for the lower transmitter-receiver pair of FIG. 5 when drilling in the three-layer anisotropic formation of FIG. 11, in accordance with various embodiments.

FIG. 11 illustrates an example response of $V_{CZ}(β)$ for the upper transmitter-receiver pair ($T_{up}$ and $R_{up}$) of FIG. 5 when drilling in a three-layer anisotropic formation. Transmitter $T_{up}$ is fired and the voltage at $R_{up}$ is measured for the azimuthal direction defined by bin 1 of FIG. 4. $V_{CZ}(β)$ has a real part 1117 and an imaginary part 1119, where both parts show significant changes at boundaries 1101 and 1103. FIG. 10 illustrates an example response of $V_{CZ}(β)$ for the lower transmitter-receiver pair ($T_{dn}$ and $R_{dn}$) of FIG. 5 when drilling in the three-layer anisotropic formation of FIG. 11. Transmitter $T_{dn}$ is fired and the voltage at $R_{dn}$ is measured for the azimuthal direction defined by bin 1 of FIG. 4. $V_{CZ}(β)$ has a real part 1217 and an imaginary part 1219, where both parts show changes at boundaries 1101 and 1103. The drilling for the examples of FIGS. 11 and 12 is also at a relative dip angle of 85 degrees. The first layer of this anisotropic formation has a horizontal resistivity $R_h$ of 1 ohm-m and a vertical resistivity $R_v$ of 4 ohm-m, the middle layer has a horizontal resistivity $R_h$ of 10 ohm-m and a vertical resistivity $R_v$ of 50 ohm-m, and the last layer has a horizontal resistivity $R_h$ of 1 ohm-m and a vertical resistivity $R_v$ of 4 ohm-m.

From FIGS. 9 to 12, it can be concluded that a perpendicularly tilted transmitter-receiver antenna system is capable of providing geosteering information and detecting boundary positions. If both tilt transmitter and tilt receiver are oriented in different adjacent quadrants (depicted in FIG. 3C), the measured signals at the receiver will be proportional to the subtraction of coupling voltage components $V_x^z$ and $V_z^x$ such that the measured signals are only sensitive to boundary effects. These measured signals are available to present geosignal responses, according to various embodiments. However, if tilt transmitter and tilt receiver are oriented in the same quadrant or diagonal quadrants, such as $1^{st}$-$3^{rd}$ quadrants or $2^{nd}$-$4^{th}$ quadrants, the measured signals effectively in part contain a summation effect of coupling voltage components $V_x^z$ and $V_z^x$. Such summation effect is sensitive to intertwined effects among anisotropy, relative dip angle, and boundary. As a result, the corresponding geosignal responses with tilt transmitter and tilt receiver oriented in the same quadrant or diagonal quadrants do not provide responses that are as good for geosteering as those provided with both tilt transmitter and tilt receiver are oriented in different adjacent quadrants.

In various embodiments, an antenna system equipped with the upper transmitter and central receivers of FIG. 5, in which both tilt transmitter and tilt receiver are oriented in different adjacent quadrants, can be used in geosteering applications. A geosignal response can be obtained as:

$$V_{Geo}(\beta) \equiv \frac{V_R^T(\beta)}{V_R^T(\beta+\pi)}, \quad (8)$$

which is the measured signal $V_R^T$ in a current bin, which is one bin direction of the N bin directions as shown in FIG. 4, divided by the measured signal $V_R^T$ in the bin 180 degrees from the current bin. The geosignal responses can be expressed in terms of geosignal phase $\phi_{Geo}$ and geosignal attenuation $A_{Geo}$ as follows:

$$\phi_{Geo}(\beta) = \text{phase}\{V_R^T(\beta)\} - \text{phase}\{V_R^T(\beta+\pi)\} \quad (9a)$$

$$A_{Geo}(\beta) = \log|V_R^T(\beta)| - \log|V_R^T(\beta+\pi)| \quad (9b)$$

Figure 13:
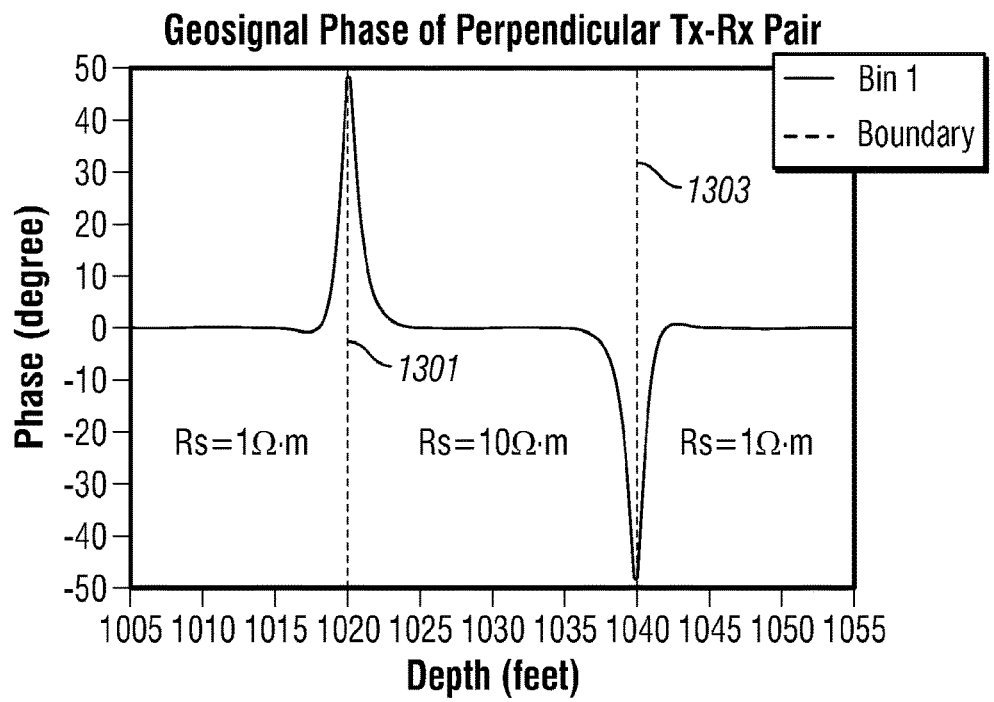
FIG. 13 illustrates an example a geosignal phase for a three-layer isotropic formation, according to various embodiments.
Figure 14:
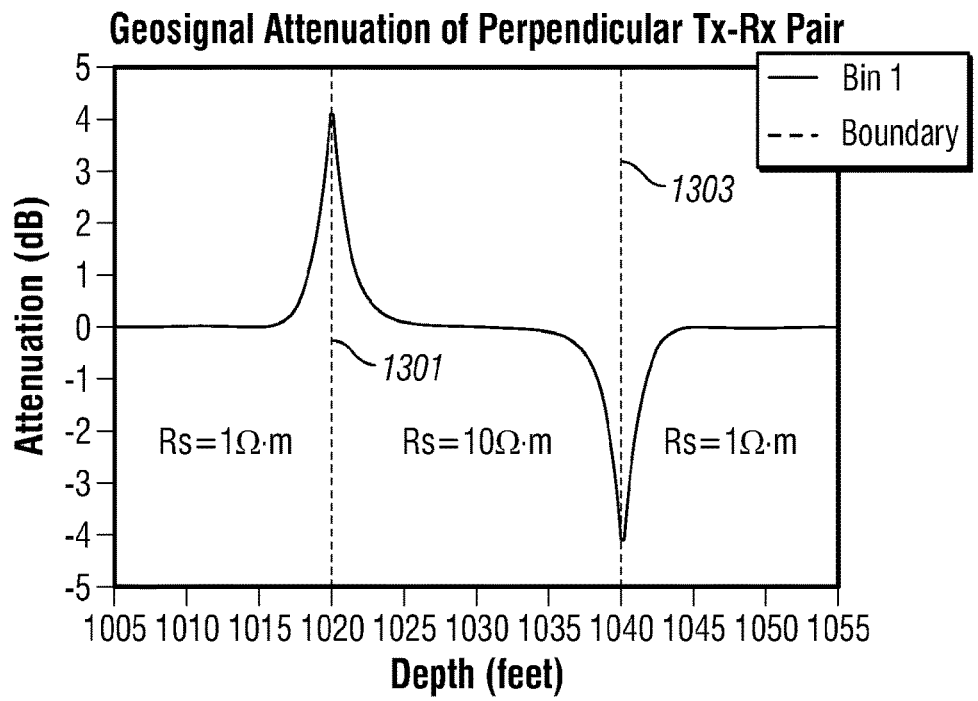
FIG. 14 illustrates an example a geosignal attenuation for the three-layer isotropic formation of FIG. 13, according to various embodiments.

FIG. 13 illustrates an example a geosignal phase for a three-layer isotropic formation. The geosignal phase $\phi_{Geo}$ of equation (9a) shown in FIG. 13 is for a perpendicular Tx-Rx pair of FIG. 5 in the direction of bin one of FIG. 4. FIG. 14 illustrates an example a geosignal attenuation for the three-layer isotropic formation of FIG. 13. The geosignal attenuation $A_{Geo}$ of equation (9b) shown in FIG. 14 is for a perpendicular Tx-Rx pair of FIG. 5 in the direction of bin one of FIG. 4. FIGS. 13 and 14 are geosignals generated from operating the tool of FIG. 5 with a transmitter-to-receiver spacing of 32 inch and frequency of 500 kHz at a relative dip angle of 85 degrees. The first layer of this isotropic formation has a resistivity of 1 ohm-m, the middle layer has a resistivity of 10 ohm-m, and the last layer has a resistivity of 1 ohm-m. These geosignals calculated from the measured voltage signal $V_R^T$ show the detection of boundaries 1301 and 1303 as a function of depth.

Figure 15:
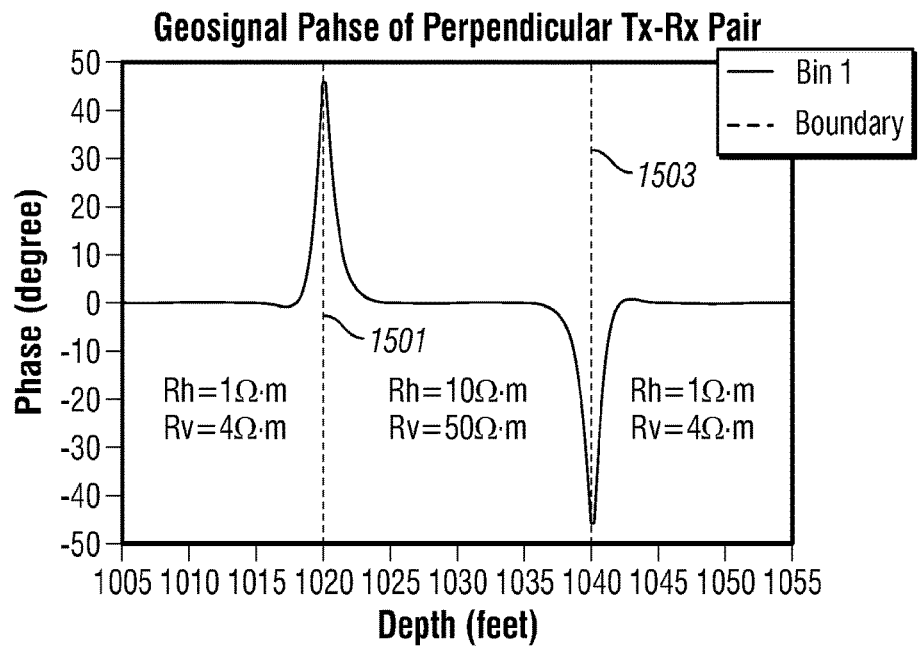
FIG. 15 illustrates an example a geosignal phase for a three-layer anisotropic formation, according to various embodiments.
Figure 16:
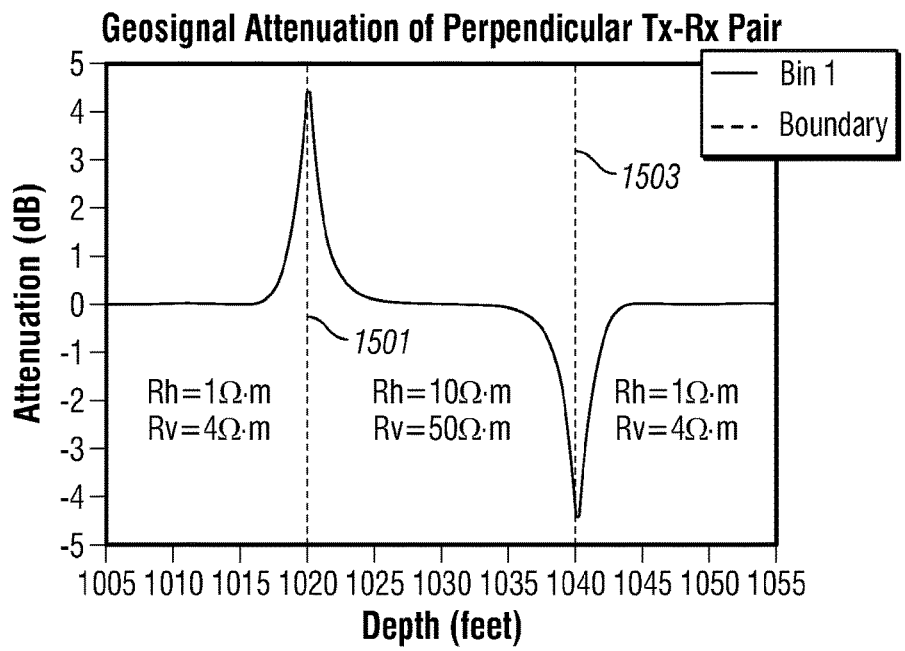
FIG. 16 illustrates an example a geosignal attenuation for the three-layer anisotropic formation of FIG. 15, according to various embodiments.

FIG. 15 illustrates an example a geosignal phase for a three-layer anisotropic formation. The geosignal phase $\phi_{Geo}$ of equation (9a) shown in FIG. 15 is for a perpendicular Tx-Rx pair of FIG. 5 in the direction of bin one of FIG. 4. FIG. 16 illustrates an example a geosignal attenuation for the three-layer anisotropic formation of FIG. 15. The geosignal attenuation $A_{Geo}$ of equation (9b) shown in FIG. 16 is for a perpendicular Tx-Rx pair of FIG. 5 in the direction of bin one of FIG. 4. FIGS. 15 and 16 are geosignals generated from operating the tool of FIG. 5 also with a transmitter-to-receiver spacing of 32 inch and frequency of 500 kHz at a relative dip angle of 85 degrees. The first layer of this anisotropic formation has a horizontal resistivity $R_h$ of 1 ohm-m and a vertical resistivity $R_v$ of 4 ohm-m, the middle layer has a horizontal resistivity $R_h$ of 10 ohm-m and a vertical resistivity $R_v$ of 50 ohm-m, and the last layer has a horizontal resistivity $R_h$ of 1 ohm-m and a vertical resistivity $R_v$ of 4 ohm-m. These geosignals calculated from the measured voltage signal $V_R^T$ show the detection of boundaries 1501 and 1503 as a function of depth.

In various embodiments, other geosignal responses $V_{Geo}^{ZX}$ and $V_{Geo}^{XZ}$ can be defined that are applicable to drilling operations. Two geosignal responses based on the antenna structure in FIG. 5 are defined as:

$$V_{Geo}^{ZX}(\beta) \equiv \frac{V_R^U(\beta) + V_R^L(\beta+\pi)}{\frac{1}{N}\sum_{i=1}^{N}\left[V_R^U\left(\frac{\beta_m}{2}+(i-1)\times\beta_i\right)+V_R^L\left(\frac{\beta_m}{2}+(i-1)\times\beta_i\right)\right]} \quad (10a)$$

$$V_{Geo}^{XZ}(\beta) \equiv \frac{V_R^U(\beta+\pi) + V_R^L(\beta+\pi)}{\frac{1}{N}\sum_{i=1}^{N}\left[V_R^U\left(\frac{\beta_m}{2}+(i-1)\times\beta_i\right)+V_R^L\left(\frac{\beta_m}{2}+(i-1)\times\beta_i\right)\right]}, \quad (10b)$$

where $V_{Geo}^{ZX}$ refers to the signals involved with ZX measurements and $V_{Geo}^{XZ}$ refers to the signals involved with XZ measurements. Both of geosignals are suitable for geosteering operations. In addition, for different antenna structures, the azimuthal angle $\beta$ of the numerator in equations (10a) and (10b) may plus or minus 180 degrees from the selected bin.

In various embodiments, several processing schemes employ the features of rotating electromagnetic (EM) logging tools. A coupling voltage matrix can be solved directly from the processing of responses of the rotating tool. Furthermore, using the solved coupling voltage matrix, formation parameters can be calculated. These parameters can include formation anisotropy, $R_h$ and $R_v$, and the relative dip angle at any borehole deviation. In addition, geosignal responses are defined that can be generated from the responses of the rotating tool. These geosignals can be used for geosteering and for calculating the distance to bed boundary (DTBB) using standard inversion techniques. Processing measured voltages as discussed herein allows for the solution of a coupling voltage matrix from which formation parameters such as anisotropy, $R_h$ and $R_v$, and the relative dip angle can be derived. Unlike conventional processes, these formation parameters can be determined at any borehole deviation. In various embodiments, for deep water situations, processing measured signals, as taught herein, can be used to calculate structure dip and anisotropy in vertical as well as deviated hole, providing structure dip in LWD.

Various components of a measurement tool having a processing unit that determines a complete coupling matrix from direct measurements using tilted transmitter and receiver antennas, as described herein or in a similar manner, can be realized in hardware implementations, software implementations, and combinations of hardware and software implementations. These implementations may include a machine-readable medium having machine-executable instructions, such as a computer-readable medium having computer-executable instructions, for operating the system to acquire voltage signals generated from operating a tool rotating in a borehole, where the tool includes multiple transmitter antennas and a receiver antenna tilted with respect to the longitudinal axis of the tool and the acquired voltage signals are measured at the tilted receiver antenna in response to firing separately the multiple transmitter antennas associated with the tilted receiver antenna, and to process the acquired voltage signals with respect to a direction in the rotation of the tool to determine properties associated with a formation in vicinity of the borehole, including determining a coupling matrix directly from the acquired voltage signals. The machine-readable medium can also store parameters used in execution of the instructions and can also store results from execution of the instructions. The machine-readable medium can include instructions to generate geosignals from the acquired voltage signals. The machine-readable medium can also include instructions to conduct geosteering based on the geosignals generated from the acquired voltage signals. In various embodiments, current measurements can be used to acquire signals to generate a coupling matrix. The form of machine-readable medium is not limited to any one type of machine-readable medium, but can be any machine-readable medium. For example, machine-readable medium can include a data storage medium that can be implemented in a housing disposed in a collar of a drill string or in a wireline configuration and/or in a system control center.

Figure 17:
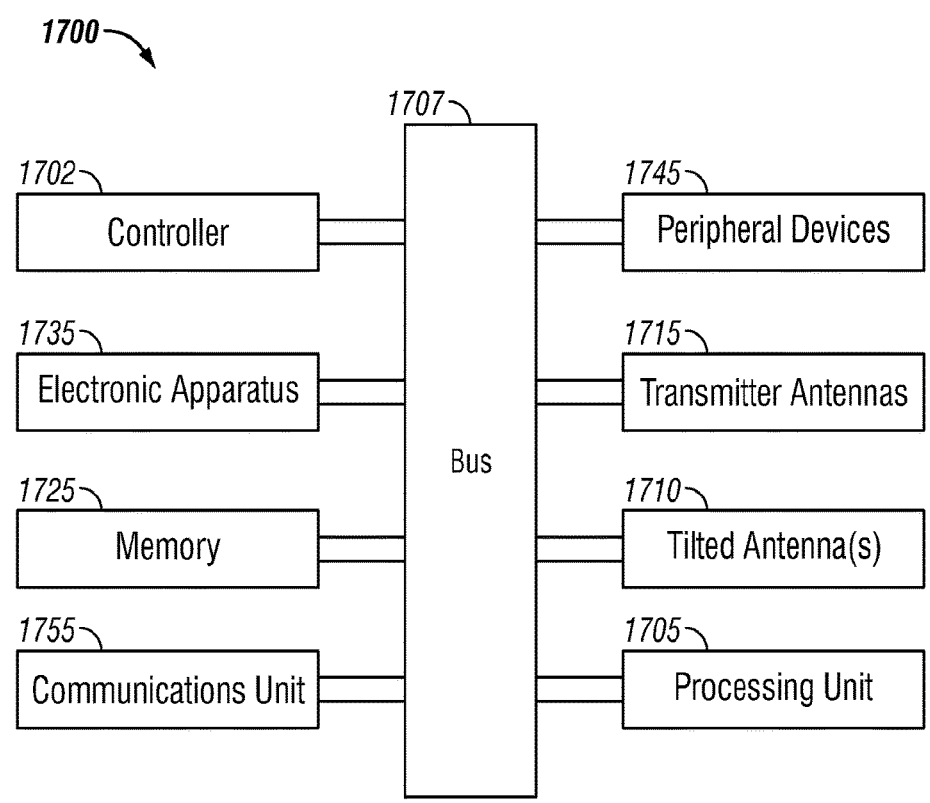
FIG. 17 depicts a block diagram of features of an embodiment of a system to process signals, from a tilted receiver in response to firing multiple antennas independently, to directly determine a coupling matrix, according to various embodiments.

FIG. 17 depicts a block diagram of features of an embodiment of a system 1700 having a processing unit 1705, one or more tilted receiver antennas 1710, and multiple transmitter antennas 1715. Processing unit 1705 is configured to process signals received at one or more tilted receiver antennas 1710 in response to firing multiple transmitter antennas 1715 independently to directly determine a coupling matrix relative to propagation of electromagnetic signals in a formation in the vicinity of a well hole due to the firing of multiple transmitter antennas 1715. Processing unit 1705 can process signals acquired from one or more tilted receiver antennas 1710 based on the direction relative to rotation of the tool on which one or more tilted receiver antennas 1710 and multiple transmitter antennas 1715 are mounted. Processing unit 1705 can perform processing identical to or similar to the processing schemes discussed with respect to various embodiments herein.

System 1700 can also include a controller 1702, a memory 1725, an electronic apparatus 1735, and a communications unit 1755. Controller 1702, memory 1725, and communications unit 1755 can be arranged to operate one or more tilted receiver antennas 1710 and multiple transmitter antennas 1715 with acquired voltage signals provided to processing unit 105 for the determination of coupling matrices, formation properties, geosignals, and geosteering operations. Processing unit 105 can be located on the surface to a well hole. Processing unit 105 can be located downhole. Processing unit can be integrated with one or more of controller 1702, memory 1725, and communications unit 1755. Processing unit 1705 can be realized to include processing schemes in accordance processing and measurement tools described herein. Communications unit 1755 can include downhole communications in a drilling operation. Such downhole communications can include a telemetry system.

System 1700 can also include a bus 1707, where bus 1707 provides electrical conductivity among the components of system 1700. Bus 1707 can include an address bus, a data bus, and a control bus, each independently configured. Bus 1707 can also use common conductive lines for providing one or more of address, data, or control, the use of which is regulated by controller 1702. Bus 1707 can be configured such that the components of system 1700 are distributed. Such distribution can be arranged between downhole components such as one or more tilted receiver antennas 1710 and multiple transmitter antennas 1715 and surface components such as processing unit 1705. Alternatively, the components can be co-located such as on one or more collars of a drill string or on a wireline structure.

In various embodiments, peripheral devices 1745 include displays, additional storage memory, and/or other control devices that may operate in conjunction with controller 1702 and/or memory 1725. In an embodiment, controller 1702 is a processor. A peripheral device arranged as a display can be used with instructions stored in memory 1725 to implement a user interface to manage the operation of processing unit 1705, one or more tilted receiver antennas 1710, multiple transmitter antennas 1715 in system 1700 and/or components distributed within system 1700.

Figure 18:
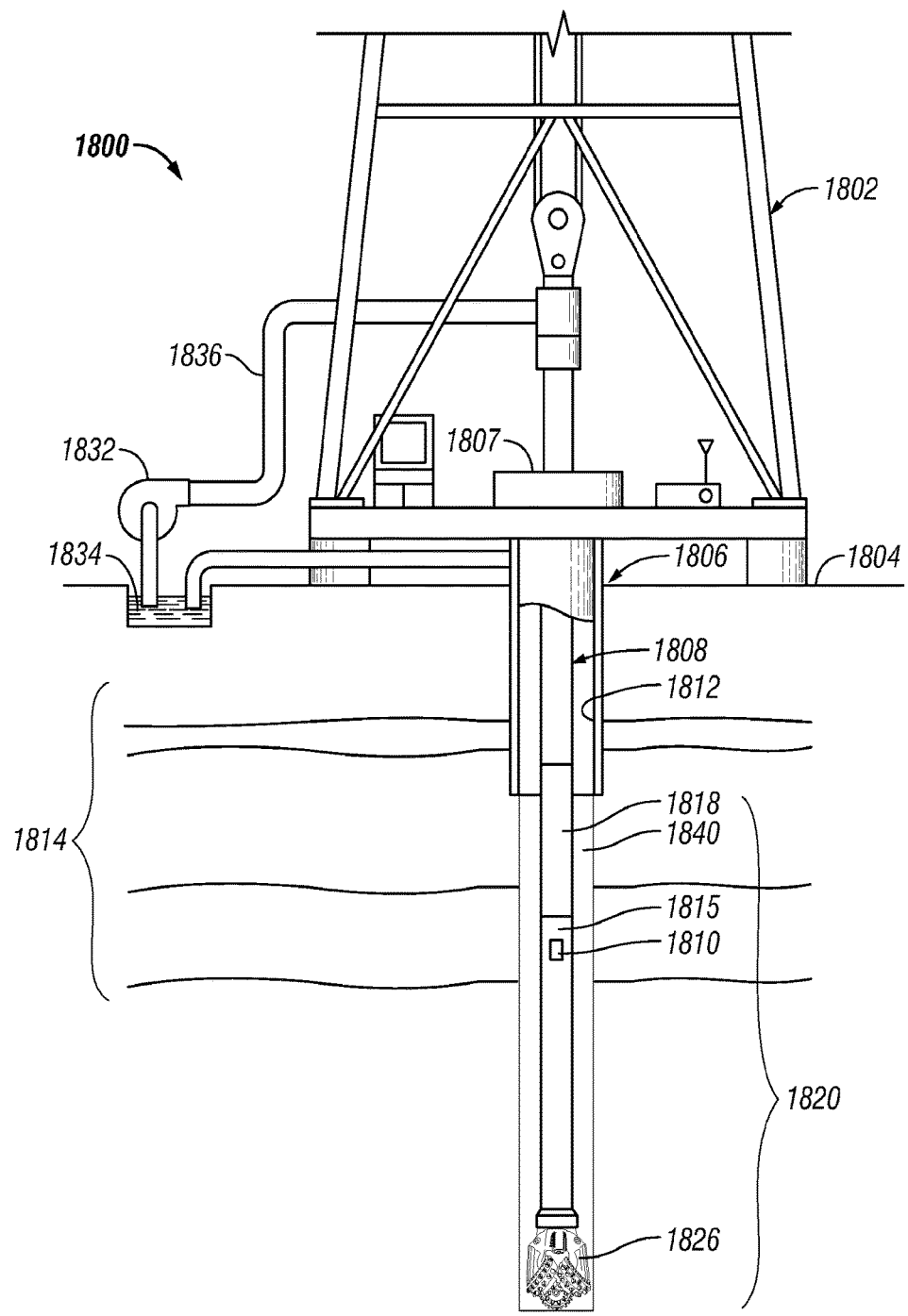
FIG. 18 depicts an embodiment of a system at a drilling site, according to various embodiments.

FIG. 18 depicts an embodiment of a system 1800 at a drilling site, where system 1800 includes a measurement tool 1810 and electronics to determine formation properties in the vicinity of a well and/or geosignals that can be used for geosteering a drilling operation. Measurement tool 1810 can include one or more tilted receiver antennas and multiple transmitter antennas, where the transmitter antennas are fired independently such that measured signals received at the tilted receiver antennas are processed to directly determine a coupling matrix relative to propagation of electromagnetic signals in the formation in the vicinity of a borehole. The coupling matrix can be used to determine formation properties such as horizontal resistivity, vertical resistivity, and relative dip angle at any borehole deviation from the solution of the coupling voltage matrix determined form the measured signals, along with generating geosignals that can be used conduct geosteering with respect to the borehole.

System 1800 can include a drilling rig 1802 located at a surface 1804 of a well 1806 and a string of drill pipes, that is, drill string 1808, connected together so as to form a drilling string that is lowered through a rotary table 1807 into a wellbore or borehole 1812. The drilling rig 1802 can provide support for drill string 1808. The drill string 1808 can operate to penetrate rotary table 1807 for drilling a borehole 1812 through subsurface formations 1814. The drill string 1808 can include drill pipe 1818 and a bottom hole assembly 1820 located at the lower portion of the drill pipe 1818.

The bottom hole assembly 1820 can include drill collar 1815, a measuring tool 1810 attached to drill collar 1815, and a drill bit 1826. The drill bit 1826 can operate to create a borehole 1812 by penetrating the surface 1804 and subsurface formations 1814.

During drilling operations, the drill string 1808 can be rotated by the rotary table 1807. In addition to, or alternatively, the bottom hole assembly 1820 can also be rotated by a motor (e.g., a mud motor) that is located downhole. The drill collars 1815 can be used to add weight to the drill bit 1826. The drill collars 1815 also can stiffen the bottom hole assembly 1820 to allow the bottom hole assembly 1820 to transfer the added weight to the drill bit 1826, and in turn, assist the drill bit 1826 in penetrating the surface 1804 and subsurface formations 1814.

During drilling operations, a mud pump 1832 can pump drilling fluid (sometimes known by those of skill in the art as "drilling mud") from a mud pit 1834 through a hose 1836 into the drill pipe 1818 and down to the drill bit 1826. The drilling fluid can flow out from the drill bit 1826 and be returned to the surface 1804 through an annular area 1840 between the drill pipe 1818 and the sides of the borehole 1812. The drilling fluid may then be returned to the mud pit 1834, where such fluid is filtered. In some embodiments, the drilling fluid can be used to cool the drill bit 1826, as well as to provide lubrication for the drill bit 1826 during drilling operations. Additionally, the drilling fluid may be used to remove subsurface formation 1814 cuttings created by operating the drill bit 1826.

Various embodiments of techniques described herein process measured signals received at one or more tilted receiver antennas in response to firing multiple transmitter antennas independently to directly determine a coupling matrix relative to propagation of electromagnetic signals in the formation in the vicinity of a well hole due to the firing of multiple transmitter antennas. A processing unit can process signals acquired from one or more tilted receiver antennas based on the direction relative to rotation of the tool on which one or more tilted receiver antennas and multiple transmitter antennas are mounted. Processing unit can perform processing identical to or similar to the processing schemes discussed with respect to various embodiments herein.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method of determining properties of a formation surrounding a borehole in which a tool coupled to a drilling tool is operating, the method comprising:
acquiring signals generated from operating the tool rotating in the borehole, the tool having a longitudinal axis, the tool including two transmitter antennas and a receiver antenna tilted with respect to the longitudinal axis, the two transmitter antennas being oriented within different adjacent quadrants with respect to the longitudinal axis, the acquired signals including signals received at the tilted receiver antenna in response to firing separately the two transmitter antennas associated with the tilted receiver antenna; and
operating a processing unit to process the acquired signals with respect to a direction relative to the rotation of the tool to determine properties associated with the formation, including determining a coupling matrix by determining a plurality of coupling voltage components directly from the acquired signals, based on the two transmitter antennas being oriented in adjacent quadrants, by directly calculating each of the plurality of coupling voltage components from the acquired signals measured at rotated positions of the tool, and the position and orientation of the tool without solving a set of equations relating the acquired signals to the coupling voltage components;
determining a geosignal from the coupling matrix; and
utilizing the geosignal to control a drilling direction of the drilling tool.

2. The method of claim 1, wherein acquiring signals includes acquiring voltage signals generated from operating the tool with the receiver antenna tilted with respect to the longitudinal axis and the two transmitter antennas placed essentially at the same location.

3. The method of claim 1, wherein acquiring signals includes acquiring voltage signals generated from operating the tool with the receiver antenna tilted with respect to the longitudinal axis such that the tilted receiver antenna is placed between the two transmitter antennas.

4. The method of claim 1, wherein acquiring signals includes acquiring voltage signals generated from operating the tool with the receiver antenna tilted with respect to the longitudinal axis and with another receiver antenna tilted with respect to the longitudinal axis and with the two receiver antennas placed between the two transmitter antennas.

5. The method of claim 4, wherein the method includes generating two coupling voltage matrices from received voltage signals at the two tilted receiver antennas.

6. The method of claim 4, wherein, with respect to the longitudinal axis, one of the two transmitter antennas is tilted at 45 degrees and the other transmitter antenna is tilted at −45 degrees and the two receiver antennas are tilted at an angle of 45 degrees.

7. The method of claim 4, wherein acquiring signals includes:
firing one of the two transmitter antennas and measuring a response at the tilted receiver antenna with respect to the firing;
firing the other transmitter antenna and measuring a response at the other tilted receiver antenna with respect to the firing of the other transmitter antenna; and
calculating coupling voltage components for a coupling matrix using the measured responses received at the two tilted receivers with respect to tool position and tool orientation; and
performing one or more inversion operations to generate formation parameters from the coupling matrix.

8. The method of claim 7, wherein the method includes determining horizontal resistivity, vertical resistivity, relative dip angle, or combinations thereof from the coupling matrix.

9. The method of claim 1, wherein acquiring signals includes acquiring voltage signals with respect to tool orientation, the tool orientation including a number of directions, the total number of directions corresponding one complete rotation partitioned into N bins, each bin associated with an angle of rotation equal to $2\pi/N$, N being an integer equal to or greater than one.

10. The method of claim 1, wherein acquiring signals includes acquiring voltage signals generated from operating the tool rotating in the borehole with the receiver antenna operated as a transmitting antenna and the two transmitter antennas tilted and operated as receiver antennas.

11. The method of claim 1, wherein the two transmitter antennas and the receiver antenna tilted with respect to the longitudinal axis is an arrangement of antennas based on criteria to arrange the antennas, wherein the criteria enables the direct determination of the coupling matrix.

12. A method of determining properties of a formation surrounding a borehole in which a tool is operating, the method comprising:
acquiring signals generated from operating a tool rotating in the borehole, the tool having a longitudinal axis, the tool including a receiver antenna tilted with respect to the longitudinal axis and two transmitter antennas, the two transmitter antennas being oriented within different adjacent quadrants with respect to the longitudinal axis, the acquired signals including signals received at the tilted receiver antenna in response to firing separately the two transmitter antennas associated with the tilted receiver antenna; and
operating a processing unit to process the acquired signals with respect to a direction in the rotation of the tool to determine properties associated with a formation, including determining a geosignal response, directly from the acquired signals based on the two transmitter antennas being oriented within different adjacent quadrants with respect to the longitudinal axis, by generating the geosignal response as a ratio of a received signal at an azimuthal angle to a received signal at the azimuthal angle plus 180°.

13. The method of claim 12, wherein the method includes geosteering of a drill operation based on the geosignal response.

14. The method of claim 12, wherein determining a geosignal response from the acquired signals includes generating the geosignal response as a geosignal phase and a geosignal attenuation.

15. The method of claim 14, wherein the method includes:
partitioning the tool rotation into N bins in which completion of the N bins is one complete rotation, $N \leq 2$;
generating, for a bin, the geosignal phase as the difference between a phase of a voltage signal received at the tilted receiver antenna in response to firing one transmitter antenna for the bin and a phase of a voltage signal received at the tilted receiver antenna in response to firing the one transmitter antenna at another bin that is 180 degrees from the bin; and
generating, for the bin, the geosignal attenuation as the difference between the log of the voltage signal received at the tilted receiver antenna in response to firing the one transmitter antenna for the bin and the log of the voltage signal received at the tilted receiver antenna in response to firing the one transmitter antenna at another bin that is 180 degrees from the bin.

16. A method comprising:
acquiring signals generated from operating a tool rotating in a borehole, the tool having a longitudinal axis, the tool including a receiver antenna tilted with respect to the longitudinal axis and two transmitter antennas, the acquired signals including signals received at the tilted receiver antenna in response to firing separately the two transmitter antennas associated with the tilted receiver antenna; and
operating a processing unit to process the acquired signals with respect to a direction in the rotation of the tool to determine properties associated with a formation, including determining a geosignal response directly from the acquired signals, wherein determining a geosignal response from the acquired signals includes generating the geosignal response as a geosignal phase and a geosignal attenuation, wherein the method includes:
partitioning the tool rotation into N bins in which completion of the N bins is one complete rotation of the tool, $N \leq 2$, each bin having an associated azimuthal angle $\beta$;
generating, for a bin at azimuthal angle $\beta$, one or both of two geosignals, the two geosignals being:

$$V_{Geo}^{ZX}(\beta) = \frac{V_R^U(\beta) + V_R^L(\beta+\pi)}{\frac{1}{N}\sum_{i=1}^{N}\left[V_R^U\left(\frac{\beta_m}{2}+(i-1)\times\beta_i\right) + V_R^L\left(\frac{\beta_m}{2}+(i-1)\times\beta_i\right)\right]}$$

and $$V_{Geo}^{XZ}(\beta) = \frac{V_R^U(\beta+\pi) + V_R^L(\beta+\pi)}{\frac{1}{N}\sum_{i=1}^{N}\left[V_R^U\left(\frac{\beta_m}{2}+(i-1)\times\beta_i\right) + V_R^L\left(\frac{\beta_m}{2}+(i-1)\times\beta_i\right)\right]}$$

where $V_{Geo}^{ZX}(\beta)$ and $V_{Geo}^{XZ}(\beta)$ are the two geosignals at the bin at azimuthal angle $\beta$, $V_R^U(\beta)$ a voltage signal at the bin at azimuthal angle $\beta$ received at the tilted receiver antenna in response to firing one of the transmitter antennas placed above the tilted receiver antenna, $V_R^L(\beta)$ is a voltage signal received at the tilted receiver antenna in response to firing the other transmitter antenna placed below the tilted receiver antenna, $V_R^U(\beta+\pi)$ is a voltage signal at another bin 180 degrees from the bin at azimuthal angle $\beta$ received at the tilted receiver antenna in response to firing one of the transmitter antennas placed above the tilted receiver antenna, $V_R^L(\beta+\pi)$ is a voltage signal at the other bin 180 degrees from the bin at azimuthal angle $\beta$ received at the tilted receiver antenna in response to firing the other transmitter antenna placed below the tilted receiver antenna, and the summation includes a voltage signal, for each bin, received at the tilted receiver antenna in response to firing one of the transmitter antennas placed above the tilted receiver antenna and a voltage signal, for each bin, received at the tilted receiver antenna in response to firing the other transmitter antenna placed below the tilted receiver antenna.

17. A non-transitory machine-readable medium that stores instructions, which when performed by a machine, cause the machine to perform operations, the operations comprising:
acquiring signals generated from operating a tool rotating in a borehole of a well, the tool coupled to a drilling tool, the tool having a longitudinal axis, the tool including a receiver antenna tilted with respect to the longitudinal axis and two transmitter antennas, the two transmitter antennas being oriented within different adjacent quadrants with respect to the longitudinal axis, the acquired signals including signals received at the tilted receiver antenna in response to firing separately the two transmitter antennas associated with the tilted receiver antenna; and
processing the acquired signals with respect to a direction relative to the rotation of the tool to determine properties associated with a formation, including determining a geosignal response, directly from the acquired signals based on the two transmitter antennas being oriented within different adjacent quadrants with respect to the longitudinal axis, by generating the geosignal response as a ratio of a received signal at an azimuthal angle to a received signal at the azimuthal angle plus 180°; and
utilizing the geosignal response to control a drilling direction of the drilling tool.

18. The non-transitory machine-readable medium of claim 17, wherein acquiring signals includes acquiring voltage signals generated from operating the tool with the receiver antenna tilted with respect to the longitudinal axis and with another receiver antenna tilted with respect to the longitudinal axis, the two receiver antennas tilted at an angle of 45 degrees with the two receiver antennas placed between the two transmitter antennas, the two transmitter antennas oriented with respect to the longitudinal axis such that one of the two transmitter antennas is tilted at 45 degrees and the other transmitter antenna is tilted at −45 degrees.

19. The non-transitory machine-readable medium of claim 17, wherein the instructions include determining horizontal resistivity, vertical resistivity, relative dip angle, or combinations thereof from a coupling matrix.

20. A non-transitory machine-readable medium that stores instructions, which when performed by a machine, cause the machine to perform operations, the operations comprising:
acquiring signals generated from operating a tool rotating in a borehole of a well, the tool having a longitudinal axis, the tool including a receiver antenna tilted with respect to the longitudinal axis and two transmitter antennas, the acquired signals including signals received at the tilted receiver antenna in response to firing separately the two transmitter antennas associated with the tilted receiver antenna; and operating a processing unit to process the acquired signals with respect to a direction in the rotation of the tool to determine properties associated with a formation, including determining a coupling matrix from the acquired signals, wherein the instructions include:
partitioning the tool rotation into N bins in which completion of the N bins is one complete rotation of the tool, N≤2, each bin having an associated azimuthal angle β; and
determining a geosignal response from the acquired signals for a bin, the geosignal response being generated as one or more of:
a geosignal phase and a geosignal attenuation, the geosignal phase as the difference between a phase of a voltage signal received at the tilted receiver antenna in response to firing one transmitter antenna for the bin and a phase of a voltage signal received at the tilted receiver antenna in response to firing the one transmitter antenna at another bin that is 180 degrees from the bin and the geosignal attenuation as the difference between the log of the voltage signal received at the tilted receiver antenna in response to firing the one transmitter antenna for the bin and the log of the voltage signal received at the tilted receiver antenna in response to firing the one transmitter antenna at another bin that is 180 degrees from the bin, $$V_{Geo}^{ZX}(\beta) = \frac{V_R^U(\beta) + V_R^L(\beta + \pi)}{\frac{1}{N}\sum_{i=1}^{N}\left[V_R^U\left(\frac{\beta_m}{2} + (i-1)\times\beta_i\right) + V_R^L\left(\frac{\beta_m}{2} + (i-1)\times\beta_i\right)\right]},$$

or $$V_{Geo}^{XZ}(\beta) = \frac{V_R^U(\beta + \pi) + V_R^L(\beta + \pi)}{\frac{1}{N}\sum_{i=1}^{N}\left[V_R^U\left(\frac{\beta_m}{2} + (i-1)\times\beta_i\right) + V_R^L\left(\frac{\beta_m}{2} + (i-1)\times\beta_i\right)\right]}$$

where $V_{Geo}^{ZX}(\beta)$ and $V_{Geo}^{XZ}(\beta)$ are the two geosignals at the bin at azimuthal angle β, $V_R^U(\beta)$ a voltage signal at the bin at azimuthal angle β received at the tilted receiver antenna in response to firing one of the transmitter antennas placed above the tilted receiver antenna, $V_R^L(\beta)$ is a voltage signal received at the tilted receiver antenna in response to firing the other transmitter antenna placed below the tilted receiver antenna, $V_R^L(\beta+\pi)$ is a voltage signal at another bin 180 degrees from the bin at azimuthal angle β received at the tilted receiver antenna in response to firing one of the transmitter antennas placed above the tilted receiver antenna, $V_R^L(\beta+\pi)$ is a voltage signal at the other bin 180 degrees from the bin at azimuthal angle β received at the tilted receiver antenna in response to firing the other transmitter antenna placed below the tilted receiver antenna, and the summation includes a voltage signal, for each bin, received at the tilted receiver antenna in response to firing one of the transmitter antennas placed above the tilted receiver antenna and a voltage signal, for each bin, received at the tilted receiver antenna in response to firing the other transmitter antenna placed below the tilted receiver.

21. An apparatus comprising:
a tool operable to rotate in a borehole, the tool coupled to a drilling tool, the tool having a longitudinal axis, the tool including a receiver antenna tilted with respect to the longitudinal axis and two transmitter antennas, the two transmitter antennas being oriented within different adjacent quadrants with respect to the longitudinal axis, the tilted receiver antenna arranged to acquire signals in response to firing separately the two transmitter antennas; and
a processing unit to process the acquired signals with respect to a direction relative to the rotation of the tool, to determine a coupling matrix by determining a plurality of coupling voltage components directly from the acquired signals, based on the two transmitter antennas being oriented in adjacent quadrants, by directly calculating each of the plurality of coupling voltage components from the acquired signals measured at rotated positions of the tool without solving a set of equations relating the acquired signals to the coupling voltage components, and the position and orientation of the tool and to determine a geosignal from the coupling matrix, the geosignal to control a drilling direction of the drilling tool.

22. The apparatus of claim 21, wherein the two transmitter antennas are placed essentially at the same location.

23. The apparatus of claim 21, wherein the tilted receiver antenna is placed between the two transmitter antennas with the two transmitter antennas.

24. The apparatus of claim 21, wherein the tool includes another receiver antenna tilted with respect to the longitudinal axis with the two receiver antennas placed between the two transmitter antennas.

25. The apparatus of claim 24, wherein the processing unit includes machine readable instructions executable by a processor to generate two coupling voltage matrices from received voltage signals at the two tilted receiver antennas.

26. The apparatus of claim 24, wherein, with to the longitudinal axis, one of the two transmitter antennas is tilted at 45 degrees and the other transmitter antenna is tilted at −45 degrees and the two receiver antennas are tilted at an angle of 45 degrees.

27. The apparatus of claim 21, wherein the processing unit includes machine readable instructions executable by a processor to determine horizontal resistivity, vertical resistivity, relative dip angle, or combinations thereof from the coupling matrix.

28. The apparatus of claim 21, wherein the processing unit includes machine readable instructions executable by a processor to determine geosignals that provide azimuthal orientation information of rotary tools associated with the drilling tool.

29. The apparatus of claim 21, wherein the geosignal is used to provide azimuthal orientation information of rotary tools or to calculate distance to bed boundaries.

30. An apparatus comprising:
a tool operable to rotate in a borehole, the tool coupled to a drilling tool, the tool having a longitudinal axis, the tool including a transmitter antenna tilted with respect to the longitudinal axis and two receiver antennas, the two receiver antennas being oriented within different adjacent quadrants, the two receiver antennas arranged to acquire signals in response to firing the tilted transmitter antenna; and
a processing unit to process the acquired signals with respect to a direction relative to a rotation of the tool, to determine a coupling matrix from determination of a plurality of coupling voltage components directly from the acquired signals, based on the two transmitter antennas being oriented in adjacent quadrants, by calculation of each of the plurality of coupling voltage components from the acquired signals measured at rotated positions of the tool, and the position and orientation of the tool and to determine a geosignal from the coupling matrix by generating the geosignal as a ratio of an acquired signal of the acquired signals at an azimuthal angle to a received signal of the acquired signals at the azimuthal angle plus 180°, the geosignal to control a drilling direction of the drilling tool.

31. The apparatus of claim 30, wherein the two receiver antennas are placed essentially at the same location.

32. The apparatus of claim 30, wherein the tilted transmitter antenna is placed between the two receiver antennas with the two receiver antennas.

33. The apparatus of claim 30, wherein the tool includes another transmitter antenna tilted with respect to the longitudinal axis with the two transmitter antennas placed between the two receiver antennas.

34. The apparatus of claim 33, wherein the processing unit is arranged to generate two coupling voltage matrices from received voltage signals at the two receivers.

35. The apparatus of claim 33, wherein, with respect to the longitudinal axis, one of the two receiver antennas is tilted at 45 degrees and the other receiver antenna is tilted at −45 degrees and the two transmitter antennas are tilted at an angle of 45 degrees.

36. The apparatus of claim 30, wherein the processing unit to process the acquired signals to determine a coupling matrix directly from the acquired signals includes multiplication and addition related operations without solving a set of equations.

37. The apparatus of claim 30, wherein the geosignal is used to provide azimuthal orientation information of rotary tools or to calculate distance to bed boundaries.

* * * * *